(12) United States Patent
Arool Emmanuel et al.

(10) Patent No.: US 11,949,628 B1
(45) Date of Patent: Apr. 2, 2024

(54) ADAPTIVE MILLIMETER WAVE PHYSICAL LAYER WIRELESS ARCHITECTURE FOR ON-BODY PRODUCTS

(71) Applicant: Amazon Technologies, Inc., Seattle, WA (US)

(72) Inventors: Cyril Arokiaraj Arool Emmanuel, San Jose, CA (US); Balamurugan Shanmugam, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 202 days.

(21) Appl. No.: 17/543,201

(22) Filed: Dec. 6, 2021

(51) Int. Cl.
| | |
|---|---|
| *H04L 5/00* | (2006.01) |
| *H04B 17/327* | (2015.01) |
| *H04L 27/26* | (2006.01) |
| *H04L 27/34* | (2006.01) |
| *H04W 72/542* | (2023.01) |

(52) U.S. Cl.
CPC ......... *H04L 5/0069* (2013.01); *H04B 17/327* (2015.01); *H04L 5/0007* (2013.01); *H04L 5/0098* (2013.01); *H04L 27/2602* (2013.01); *H04L 27/3405* (2013.01); *H04W 72/542* (2023.01)

(58) Field of Classification Search
None
See application file for complete search history.

(56) References Cited

U.S. PATENT DOCUMENTS

| | | | | |
|---|---|---|---|---|
| 11,770,197 | B2* | 9/2023 | Zhang | H04B 17/309 |
| | | | | 382/103 |
| 2019/0305903 | A1* | 10/2019 | Badic | H04W 72/542 |
| 2019/0393618 | A1* | 12/2019 | Guthrie | H01Q 3/36 |
| 2020/0187208 | A1* | 6/2020 | Hou | H04L 5/0032 |
| 2021/0136515 | A1* | 5/2021 | Zhang | H04W 4/023 |

* cited by examiner

*Primary Examiner* — Diane L Lo
(74) *Attorney, Agent, or Firm* — Lowenstein Sandler LLP

(57) ABSTRACT

Technologies to improve wireless communications by on-body products are described. One device includes millimeter wave (mmWave) frequency front-end circuitry and a baseband processor with an Orthogonal Frequency Division Multiplexing (OFDM) physical (PHY) layer. The baseband processor determines received signal strength indicator (RSSI) value and phase value associated with a wireless channel in a mmWave frequency range. The baseband processor determines a state of motion of the device using the RSSI value and the phase value. The baseband processor sends data to the second device using a first subcarrier structure of the OFDM PHY layer, in response to the state of motion being a first state of motion. The baseband processor sends data to the second device using a second subcarrier structure of the OFDM physical layer, in response to the state motion being a second state of motion having more motion than the first state of motion.

20 Claims, 18 Drawing Sheets

| | |
|---|---|
| Channel | mmWave human body model |
| Channel bandwidth (MHz) | 2 |
| IFFT/FFT size | 16 |
| IFFT/FFT clock (MHz) | 2 |
| Subcarrier spacing (KHz) | 125 |
| Data subcarriers | 4 |
| Pilot subcarriers | 4 |
| Guard band subcarriers | Left-3, Right-4 |
| Modulation | 4-QAM / QPSK |
| OFDM symbol duration (us) | 8 |
| Channel coding | 0 |

| Channel | mmWave human body model |
|---|---|
| Channel bandwidth (MHz) | 2 |
| IFFT/FFT size | 16 |
| IFFT/FFT clock (MHz) | 2 |
| Subcarrier spacing (KHz) | 125 |
| Data subcarriers | 8 |
| Pilot subcarriers | 4 |
| Guard band subcarriers | Left-1, Right-2 |
| Modulation | 8-QAM |
| OFDM symbol duration (us) | 8 |
| Channel coding | BCC, 1/2 |

ADAPTIVE MILLIMETER WAVE PHYSICAL LAYER WIRELESS ARCHITECTURE FOR ON-BODY PRODUCTS

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present embodiments will be understood more fully from the detailed description given below and from the accompanying drawings of the present disclosure, which, however, should not be taken to limit the present embodiments, but are for explanation and understanding only.

DETAILED DESCRIPTION

Figure 1:
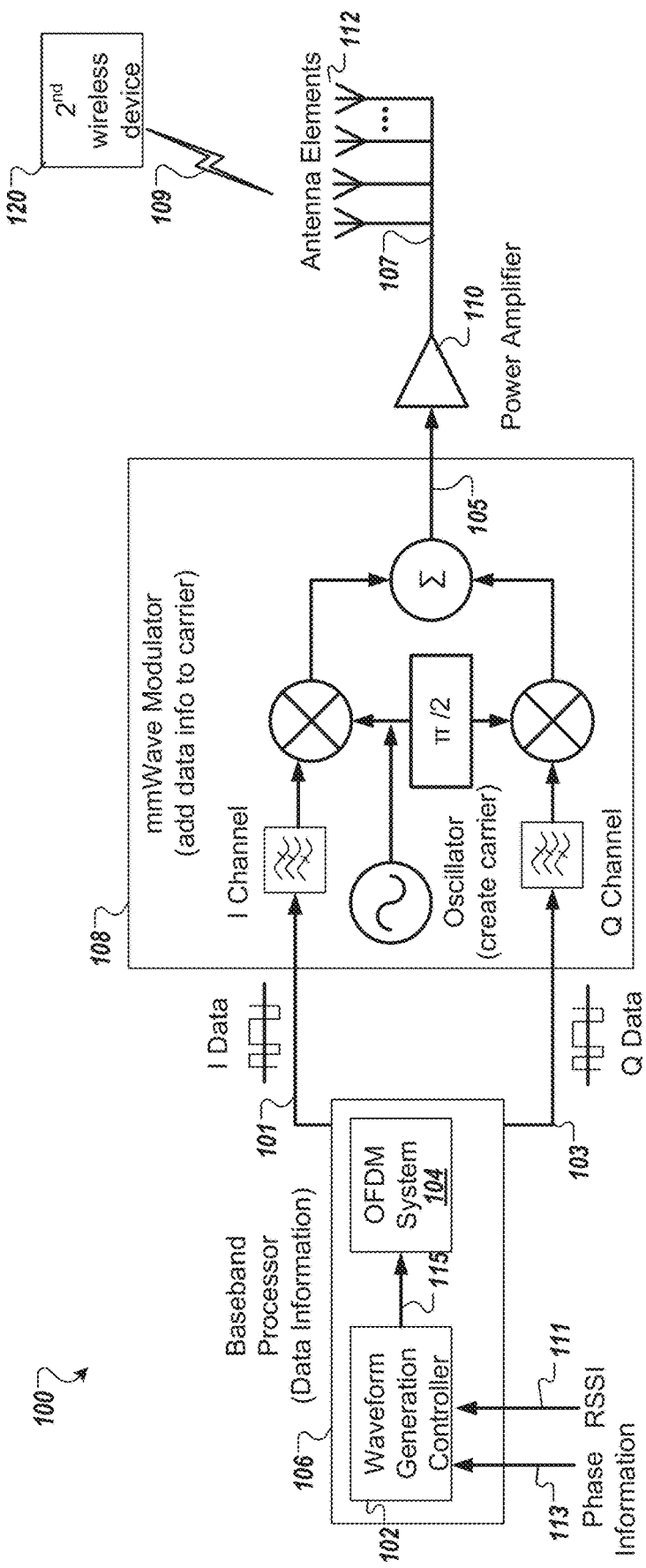
FIG. 1 is a block diagram of an electronic device with a waveform generation controller and an OFDM system to improve a link margin of a wireless channel in a millimeter wave (mmWave) frequency range, according to one embodiment.

Technologies to improve wireless communications by on-body products are described. The 2.4 GHz and 5 GHz industrial, scientific, and medical (ISM) radio bands allow unlicensed wireless communications. Due to its unlicensed nature, many short-range, low-power wireless communication systems operate in these frequency bands. Wireless local area network (WLAN) radios and personal area network (PAN) radios operate in the 2.4 GHz frequency band. PAN technology, including radios implementing the Bluetooth® technology, is widely used for inter-device audio (i.e., music/voice) and data streaming applications. The Bluetooth® standards specification has defined a physical (PHY) layer architecture with baseband processing, radio frequency (RF) signaling, and air interface schemes for mainly indoor and outdoor wireless channel models. Given the simplicity of the PHY layer architecture, protocols, profiles, and operation in the 2.4 GHz unlicensed ISM band, many consumer devices have adopted it for on-body devices, including hearable devices and wearable devices. User experiences with on-body devices indicate that the existing PHY layer architecture is unsuitable or marginal for on-body applications due to high RF energy absorption of the human body, such as greater than 105 dB levels. The complexities of human body geometry and different mobility use cases can exacerbate it further. As a result, the existing PHY layer architecture has poor system link margins resulting in audio or music dropouts or stutters, causing poor user experience and affecting safety-critical applications. Additionally, the use of the 2.4 GHz unlicensed ISM band leads to interference from household appliances, like a microwave oven and other consumer wireless devices, further degrading the user experience.

Aspects of the present disclosure can overcome the deficiencies above and others by providing a millimeter wave (mmWave) PHY layer architecture and schemes based on on-body mmWave channel structures corresponding to different human body geometries and different mobility use cases. The International Telecommunications Union (ITU) has designated radio frequencies from 30 to 300 GHz as extremely high frequency (EHF). Radio waves in this spectrum have wavelengths from one to ten millimeters, hence the millimeter wave terminology. The embodiments described herein can be used in a frequency range greater than 6 GHz up to 300 GHz. In the mmWave band (e.g., 30 GHz/60 GHz), much of the incident power (about 34% to 42%) is reflected at the skin surface, resulting in lesser RF energy absorption within the human body. While this results in higher received power levels at the receiver (better link margins), propagation of mmWave EM fields on the human body results in scattering phenomenon (due to reflections, diffractions), leading to time and frequency dispersions (caused by mobility use cases inducing doppler/micro-doppler effects etc.) that result in higher variations in amplitude and fluctuations in the phase of the received signal. Using existing architectures with these types of received signals would lead to a higher bit error rate (BER) or frame error rate (FER) unsuitable for hearable and wearable use cases. Aspects of the present disclosure can determine a motion state using the RSSI and phase information and use different OFDM waveform structures based on the motion state as described herein. A digital modulation scheme can define the subcarrier structure based on the amount of motion of a user wearing the electronic device 100. Each subcarrier structure can define a direct current (DC) subcarrier, a set of data subcarriers, and a set of pilot subcarriers that can be used to communicate data to a second wireless device in a mmWave frequency range. The different OFDM waveform structures can also use different modulation schemes, such as eight quadrature amplitude modulation (8-QAM), four QAM (4-QAM), two QAM (2-QAM), or the like. The different OFDM waveform structures can also use different guard band subcarriers. The use of the different OFDM waveform structures based on the motion state results in higher received power levels at the receiver, resulting in higher system link margins in the wireless channel.

One device includes millimeter wave (mmWave) frequency front-end circuitry and a baseband processor with an Orthogonal Frequency Division Multiplexing (OFDM) physical (PHY) layer. The baseband processor determines a received signal strength indicator (RSSI) value and phase value associated with a wireless channel in a mmWave frequency range. The baseband processor determines a state of motion of the device using the RSSI value and the phase value. The baseband processor communicates data with the second device using a first subcarrier structure of the OFDM PHY layer, in response to the state of motion being a first state of motion. The baseband processor communicates data with the second device using a second subcarrier structure of the OFDM physical layer, in response to the state motion being a second state of motion having more motion than the first state of motion. That is, the movement of the first wireless device is greater in the second state of motion than in the first state of motion.

Although various embodiments are described below with respect to Orthogonal Frequency Division Multiplexing (OFDM) physical layer (PHY) parameter structure, the embodiments described herein can be used in connection with other modulation schemes, as well as other multi-channel communication systems.

FIG. 1 is a block diagram of an electronic device 100 with a waveform generation controller 102 and an OFDM system 104 to improve a link margin of a wireless channel in a millimeter wave (mmWave) frequency range, according to one embodiment. The electronic device 100 can be an on-body electronic device, such as a wearable device or a hearable device. The electronic device 100 includes a baseband processor 106, including the waveform generation controller 102 and the OFDM system 104. The electronic device also includes a mmWave modulator 108, a power amplifier 110, and an antenna 112 with one or more antenna elements.

The OFDM system 104 includes a digital signal processing logic (e.g., hardware, software, or any combination thereof) that implements a digital multi-carrier modulation scheme—OFDM scheme. The OFDM scheme extends the concept of a single subcarrier modulation by using multiple subcarriers within a same single channel. Rather than transmitting a high-rate stream of data with a single subcarrier, OFDM uses a number of closely spaced orthogonal subcarriers transmitted in parallel. Each subcarrier is modulated with a digital modulation scheme, such as quadrature phase-shift keying (QPSK), 16QAM, etc.) at a low symbol rate. The combination of many subcarriers enables similar data rates as single-carrier modulation schemes with similar bandwidths. In the OFDM system 104, different information streams are mapped onto separate parallel frequency channels, each channel being separated by a frequency guard band to reduce interference between adjacent channels. So, in OFDM system 104, multiple subcarriers carry the information stream. The subcarriers are orthogonal to each other. The guard interval is added to each symbol to minimize the channel delay spread and inter-symbol interference. The OFDM system 104 can map digital modulated input data, referred to as data symbols, onto orthogonal subcarriers in the digital domain. The data symbols are frequency-domain input data, such as complex numbers represented by the modulated subcarriers), and the OFDM system 104 converts the data symbols to the time-domain output data representing the analog OFDM symbol waveforms. In the illustrated embodiment, the OFDM system 104 outputs the OFDM symbol waveforms as I data 101 and Q data 103.

In general, the mmWave modulator 108 receives the output data from the OFDM system 104, modulates the output data to add the output data to a carrier signal to obtain a data-carrying signal 105. The data-carrying signal 105 is output by the mmWave modulator 108 to the power amplifier 110 that amplifies the data-carrying signal 105 to transmit the data-carrying signal 105 as a mmWave signal 107 via the antenna 112.

The baseband processor 106 includes the waveform generation controller 102. The waveform generation controller 102 can determine received signal strength indicator (RSSI) information 111 (e.g., one or more RSSI values) associated with a wireless channel 109 between the electronic device 100 and a second wireless device 120. The RSSI information 111 indicates a physical distance between the second wireless device 120 and the electronic device 100. The waveform generation controller 102 can determine phase information 113 (e.g., one or more phase values) associated with the wireless channel 109. The RSSI information 111 and the phase information 113 collectively can indicate the amount of motion of a user using the electronic device 100. The user may be holding the electronic device 100, wearing the electronic device 100, or the like. The motion can be the amount of movement by the user, the amount of motion by the electronic device 100, or the amount of relative motion between the electronic device 100 and the second wireless device 120. The motion can change the physical distance between the devices, as reflected in the RSSI information 111. The motion can change the phase of the wireless channel 109 as well. Changes in the phase can be used to characterize the state of motion.

The waveform generation controller 102 can determine a state of motion based on the RSSI information 111 and the phase information 113 of the wireless channel 109. For example, if the RSSI information 111 is within a first range of values (e.g., −50 dBm to −60 dBm), and the phase change, as reflected in the phase information 113, is within a second range of values (e.g., −50 deg to +50 deg), then the person is in a first state of motion, referred to as a "static" state. The user may be lying down, sleeping, or in other stationery or minimal motion conditions. In response to the first state of motion being detected, a first subcarrier structure can be used to communicate data with the second wireless device 120. If the RSSI information 111 is within a third range of values (e.g., −40 dBm to −50 dBm), and the phase change, reflected in the phase information 113, is either lower or higher than the second range (e.g., lower than −50 deg and higher than +50 deg), then the user is in a second state of motion, referred to as a "semi-static" state. The user may be sitting, standing, moving arms, or other low motion conditions. For all other rapidly changing motion, as reflected in the phase information 113 and/or the RSSI information 111, then the person is in a third state of motion, referred to as a "dynamic" state. The user may be walking, running, or other motion conditions. As described below, the three motion states can represent different on-body mmWave channel structures that use three different subcarrier structures.

In at least one embodiment, the waveform generation controller 102 can determine i) a first state of motion based on the RSSI information 111 being within a first range and the phase information 113 being within a second range, Using the determined state of motion; or ii) a second state of motion based on the RSSI information 111 being within a third range greater than the first range and the phase information 113 being either less than or greater than the second range; or iii) a third state if not the first state or the second state. An amount of motion in the third state is greater than that in the first state. An amount of motion in the third state is greater than that in the second state. The waveform generation controller 102 can communicate data with the second device using i) a first subcarrier structure in response to a determination of the first state, ii) a second subcarrier structure in response to a determination of the second state; or iii) alternating between the first subcarrier structure and the second subcarrier structure in response to a determination of the third state.

In at least one embodiment, the first subcarrier structure specifies a direct current (DC) subcarrier, a first set of four data subcarriers, a first set of four pilot subcarriers with one of the four data subcarriers between each of the four pilot subcarriers and the DC subcarrier, and a first quadrature amplitude modulation (QAM) scheme (e.g., 4-QAM/QPSK, 2-QAM/BPSK). The second subcarrier structure specifies the DC subcarrier, a second set of eight data subcarriers, a second set of four pilot subcarriers with two of the eight data subcarriers between each of the four pilot subcarriers and the DC subcarrier, and a second QAM scheme (8-QAM). The waveform generation controller 102 can provide control information 115 (e.g., control signals, instructions, commands, or the like) to the OFDM system 104 to modify parameters of an OFDM parameter structure that controls operations of the OFDM system 104 described in more detail below. In one embodiment, the waveform generation controller 102 receives the RSSI information 111 and the phase information 113 from another processing block within the baseband processor 106 or from a processing block or circuitry coupled to the baseband processor 106.

In at least one embodiment, the first subcarrier structure specifies a DC subcarrier, a first set of two or more data subcarriers, a first set of two or more pilot subcarriers with one of the two or more data subcarriers between each of the two or more pilot subcarriers and the DC subcarrier, and a first QAM scheme (e.g., 4-QAM/QPSK, 2-QAM/BPSK). The second subcarrier structure specifies the DC subcarrier, a second set of three or more data subcarriers, a second set of two or more pilot subcarriers with two of the three or more data subcarriers between each of the two or more pilot subcarriers and the DC subcarrier, and a second QAM scheme (8-QAM).

The OFDM system 104 can generate the I data 101 and the Q data 103 using whichever subcarrier structure selected by the waveform generation controller 102. That is, the OFDM system 104 uses the first subcarrier structure in the first motion state and the second subcarrier structure in the second motion state. The OFDM system 104 alternates between the first and second subcarrier structures in the third motion state. The OFDM system 104 outputs the I data 101 and Q data 103 to output to the mmWave modulator 108, which modulates the output data with a carrier signal to obtain a data-carrying signal 105. The data-carrying signal 105 is output by the mmWave modulator 108 to the power amplifier 110 that amplifies the data-carrying signal 105 to transmit the data-carrying signal 105 as a mmWave signal 107 via the antenna 112. In at least one embodiment, the antenna 112 includes a set of four or more antenna elements. Each of the four antenna elements can be located at a vertex of a polygon shape (e.g., a square, a rectangle, a diamond, a hexagon, a pentagon, or the like). The set of four or more antenna elements generates a circularly polarized (CP) radiation pattern. The CP radiation pattern combines vertical and horizontal polarized electric field components with less than a 3 dB axial ratio.

In one embodiment, the waveform generation controller 102 can provide control information 109 (e.g., control signals, instructions, commands, or the like) to the OFDM system 104 to modify parameters of an OFDM parameter structure that controls operations of the OFDM system 104. For example, the OFDM parameter structure can specify first parameter information that controls the operation of the OFDM system 104 in a first mode, such as when the electronic device 100 is in a first motion state. The waveform generation controller 102 can modify the first parameter information to second parameter information, the second parameter information controlling operation of the OFDM system 104 in a second mode, such as when the electronic device 100 is in a second motion state. The waveform generation controller 102 can alternate between the first parameter information and second parameter information to control the operation of the OFDM system 104 in a third mode, such as when the electronic device 100 is in a third motion state. The parameter information of the OFDM parameter structure may include total bandwidth (BW), operating bandwidth (OBW), subcarrier spacing, information rate, modulation, coding rate, total subcarriers, data subcarriers, pilot subcarriers, and direct current (DC) subcarrier. The parameter information of the OFDM parameter structure can also include a channel bandwidth, an inverse Fast Fourier Transform (IFFT)/Fast Fourier Transform (FFT) size, an IFFT/FFT clock (MHz), subcarrier spacing (kHz), data subcarriers, pilot subcarriers, guard band subcarriers, modulation scheme, OFDM symbol duration, and channel coding. The parameter information of the OFDM parameter structure can be modified by the waveform generation controller 102 to modify the operation of the OFDM system 104 in the respective mode.

The electronic device 100 can also include additional components, such as one or more processors (e.g., a host processor or central processing unit (CPU), one or more graphics processors, input-output (I/O) devices, memory devices, storage devices, or the like. The baseband processor 106 can include additional components, such as a processing device that can execute operations to implement the processing logic of the waveform generation controller 102. Alternatively, the waveform generation controller 102 can be implemented as hardware, such as a hardware state machine that receives one or more inputs, changes to one or more states based on the inputs, and outputs one or more control signals based on the current state. In some cases, the functionality of the waveform generation controller 102 can be integrated into or in connection with the OFDM system 104. The baseband processor 106 can include one or more interfaces, such as a serial interface like the I2C interface that can be used by the waveform generation controller 102 to generate one or more control signals to control the OFDM system 104, the power amplifier 110, or any combination thereof. The baseband processor 106 can include one or more interfaces with a host processor to communicate status, data, whether a transmitter is active, which transmitter is active, modulation and coding scheme (MCS) information, or the like. In another embodiment, the baseband processor 106 includes an interface to a power detector circuit (not illustrated in FIG. 1). The interface can be used to receive the RSSI information 111 measured at a receiver (not illustrated.

The electronic device 100 includes a circuit board, such as a printed circuit board (PCB) upon which one or more of the components described above is disposed. The components can be integrated into one or more integrated circuits. The baseband processor 106 and the mmWave modulator 108 are separate integrated circuits or chipsets in some embodiments. In one embodiment, the baseband processor 106 and the mmWave modulator 108 reside on a common carrier substrate die of an integrated circuit. In other embodiments, the baseband processor 106 and the mmWave modulator 108 are disposed on the PCB along with the mmWave front-end circuitry (also referred to as radio frequency front-end (RFFE) circuitry), such as the power amplifier 110, the mmWave modulator 108, or the like. The mmWave FFE circuitry can include a single mmWave radar chip, multiple chips, or other configurations of analog components coupled to the baseband processor 106 to generate signals in the mmWave frequency ranges. The baseband processor 106 is operable to generate mmWave signals to radiate electromagnetic energy via one or more antennas, such as the antenna 112. In some cases, the baseband processor 106, mmWave modulator 108, the power amplifier 110, or any combination thereof can be implemented in a mmWave module, such as a chipset implementing the mmWave technology. In one embodiment, the mmWave circuitry includes a mmWave radio. In other embodiments, the mmWave radios may be specific to the frequency bands of interest. A processing device coupled to the baseband processor 106 may be an application processor (AP) that implements other operations of the electronic device 100. In another embodiment, an application-specific integrated circuit (ASIC), a field-programmable gate array (FPGA), or other mixed-signal integrated circuits may be used to implement the operations described herein to control the operation of the OFDM system 104 when connected to another device on the band edge channel.

In one embodiment, the baseband processor 106 includes one or more transceivers that can operate at mmWave frequencies or at least 6 GHz or higher. The baseband processor 106 can also operate with other radio technologies, such as the Wi-Fi® technology. It should be noted that the Wi-Fi® technology is the industry name for wireless local area network communication technology related to the IEEE 802.11 family of wireless networking standards by Wi-Fi Alliance. For example, a dual-band WLAN RF transceiver allows an electronic device to exchange data or connect to the Internet wireless using radio waves in two WLAN bands (2.4 GHz band, 5 GHz band) via one or multiple antennas. For example, a dual-band WLAN RF transceiver includes a 5 GHz WLAN channel and a 2.4 GHz WLAN channel. The WLAN radio may include additional transceivers that operate in the 2.45 GHz, 5 GHz, or both. A PAN module includes a transceiver that also operates at 2.4 GHz and may implement the Bluetooth® technology or the Zigbee® technology. The WLAN radio and PAN radio can be individual chipsets, even chipsets provided by different vendors. The WLAN radio and the PAN radio may be implemented in the same chipset or on a common carrier substrate with a processing device, such as in a System on Chip (SoC) architecture. In another embodiment, other wireless RF radios may be used to implement other technologies, such as the LTE technology, or the like. For example, the RF circuitry may include other radios, such as a wireless area network (WAN) radio, PAN radio, GNSS radio (e.g., global positioning system (GPS) radio), or the like.

In other embodiments, the antenna architecture may include additional RF radios and/or other communication modules, such as a WLAN radio, a GPS receiver, a near field communication (NFC) radio, an amplitude modulation (AM) radio receiver, a frequency modulation (FM) radio receiver, a PAN radio (e.g., Bluetooth® radio, Zigbee® radio), a GNSS receiver, or the like. The RF circuitry may also include receivers and/or transmitters, filters, amplifiers, mixers, switches, and/or other electrical components. The RF circuitry may be coupled to a modem that allows the user device to handle both voice and non-voice communications (such as communications for text messages, multi-media messages, media downloads, web browsing, etc.) with a wireless communication system. The modem may provide network connectivity using any type of digital mobile network technology, including, for example, LTE, LTE advanced (4G), CDPD, GPRS, EDGE, UMTS, 1×RTT, EVDO, HSDPA, WLAN (e.g., Wi-Fi® network), etc. In the depicted embodiment, the modem can use the RF circuitry to radiate electromagnetic energy on the antennas to communicate data to and from the user device in the respective frequency ranges. In other embodiments, the modem may communicate according to different communication types (e.g., WCDMA, GSM, LTE, CDMA, WiMAX, etc.) in different cellular networks. It should be noted that radiation enables the functionality of both transmission and receiving data using reciprocity.

In one embodiment, the OFDM system 104 is implemented as hardware, software, firmware, or any combination thereof in a digital domain, an analog domain, or both. In other embodiments, the OFDM system 104 includes an OFDM block in a digital domain and an analog front-end in the RF domain, such as illustrated in FIG. 2.

Figure 2:
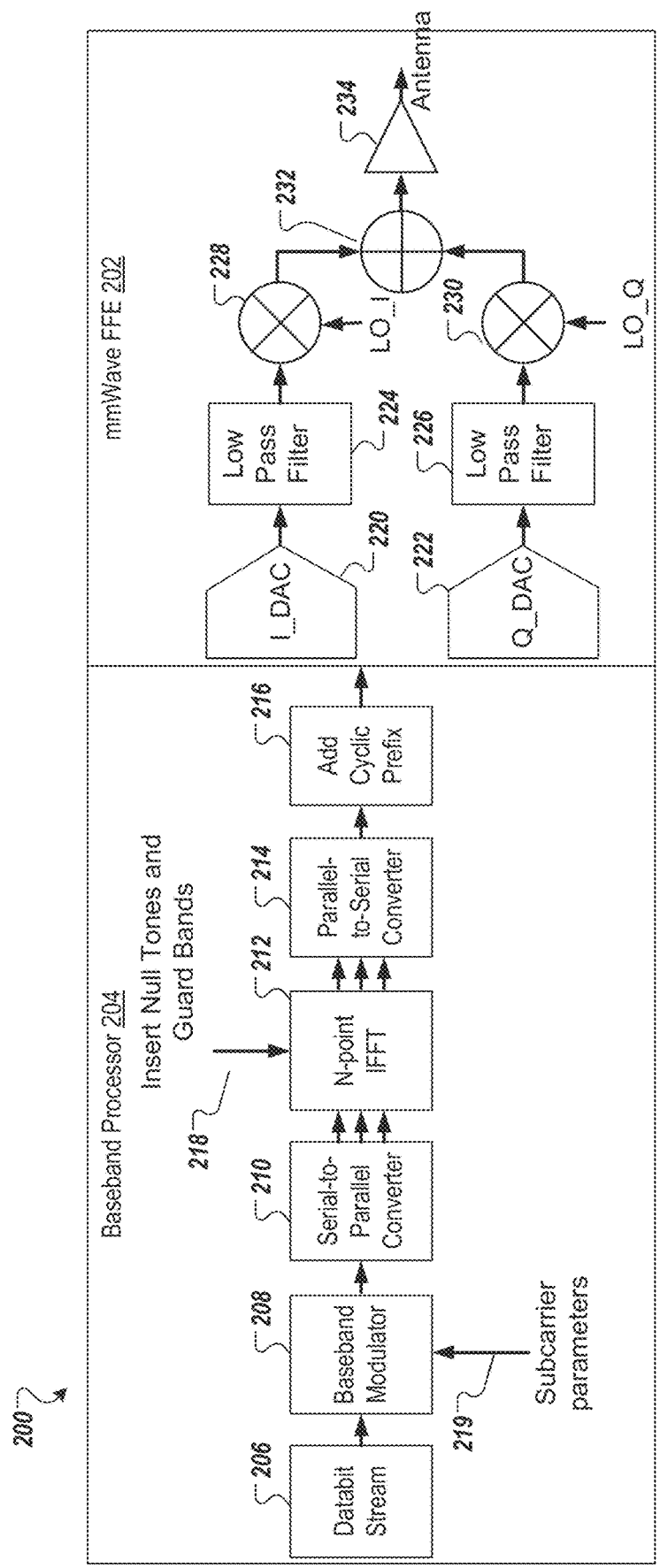
FIG. 2 is a block diagram of a radio having an OFDM block in a digital domain and a mmWave frequency front-end (FFE) in a mmWave frequency domain according to one embodiment.

FIG. 2 is a block diagram of a radio having an OFDM block 204 in a digital domain and a mmWave frequency front-end (FFE) 202 in a mmWave frequency domain according to one embodiment. The concepts used in a simple analog OFDM implementation can be extended to the digital domain by using a combination of Fast Fourier Transform (FFT) and Inverse Fast Fourier Transform (IFFT) digital signal processing. These transforms may digitally modulate input data (data symbols) onto orthogonal subcarriers. In principle, the IFFT takes frequency-domain input data (complex numbers representing the modulated subcarriers) and converts it to the time-domain output data (analog OFDM symbol waveform). In a digitally implemented OFDM system, referred to as the OFDM block of the baseband processor 204, the input bits in data bitstream 206 are input into a baseband modulator 208. The baseband modulator 208 is controlled by control information 219 that includes the subcarrier parameters corresponding to the state of motion detected based on the RSSI value and the phase value as described herein. The input bits are grouped and mapped to source data symbols that are a complex number representing the modulation constellation point (e.g., the BPSK or QAM symbols that would be present in a single subcarrier system).

The baseband modulator 208 provides the output to a serial-to-parallel converter 210 to provide inputs to an N-point IFFT 212. The transmitter treats these complex source symbols as though they are in the frequency domain and inputs to the N-point IFFT 212 that transforms the data into the time domain. The N-point IFFT 212 takes in N source symbols at a time where N is the number of subcarriers in the system. Each of these N input symbols has a symbol period of T seconds. The output of the N-point IFFT 212 is N orthogonal sinusoids. These orthogonal sinusoids each have a different frequency, and the lowest frequency is a direct current (DC).

The input symbols are complex values representing the mapped constellation point and therefore specify both the amplitude and phase of the sinusoid for that subcarrier. The output of the N-point IFFT 212 is the summation of all N sinusoids. Thus, the N-point IFFT 212 provides a simple way to modulate data onto N orthogonal subcarriers. The block of N output samples from the N-point IFFT 212 make up a single OFDM symbol. The output of the N-point IFFT 212 can be received by a parallel-to-serial converter 214 to convert the output into serial form.

After some additional processing, such as adding a cyclic prefix 216 to the output of the parallel-to-serial converter 214, the time-domain signal that results from the N-point IFFT 212 is transmitted across a radio channel (mmWave FFE 202). Although not illustrated in FIG. 2, at a receiver, an FFT block is used to process the received signal and bring it into the frequency domain, which is used to recover the original data bits.

For example, an 802.11a OFDM carrier signal (burst type) is the sum of one or more OFDM symbols, each comprised of 52 orthogonal subcarriers, with baseband data on each subcarrier being independently modulated using quadrature amplitude modulation (available formats: BPSK, QPSK, 16-QAM, or 64-QAM). This composite baseband signal is used to modulate a main RF carrier. The input data bit stream is encoded with convolutional coding and interleaving to begin the OFDM signal creation process. Each data stream is divided into groups of 'n' bits (1 bit-BPSK, 2 bits-QPSK, 4 bits-16QAM, or 6 bits-64QAM) and converted into complex numbers (I+jQ) representing the mapped constellation point. Note that the bit rate will differ depending on the modulation format, a 64-QAM constellation (6 bits at a time) can have a bit rate of 54 Mbps, while a QPSK constellation (2 bits at a time) may only be 12 Mbps. Then 52 bins of the N-point IFFT 212 are loaded. The 48 bins contain the constellation points mapped into frequency offset indexes ranging from −26 to +26, skipping 4 Pilot bins, corresponding to four pilot subcarriers, and zero bin corresponding to a DC subcarrier. For example, there can be four pilot subcarriers inserted into frequency offset index locations. The zero bin is the Null or DC subcarrier and is not used; it contains a 0 value (0+j0). As described herein, in some embodiments, additional subcarriers can be nulled in addition to the DC subcarrier. To do so, null tones and guard bands are inserted as inputs 218 into the N-point IFFT 212.

When the N-point IFFT 212 is completely loaded, the Inverse FFT is computed, giving a set of complex time-domain samples representing the combined OFDM subcarrier waveform. The samples can be clocked out at 20 Msps to create a 3.2 μs (20 Msps/64) duration OFDM waveform, for example. To complete the OFDM symbol, a 0.8 μs duration Guard Interval (GI) is then added to the beginning of the OFDM waveform. This produces a single OFDM symbol with a time duration of 4 μs in length, (3.2 μs+0.8 μs). The process is repeated to create additional OFDM symbols for the remaining input data bits. To complete the OFDM frame structure, the single OFDM symbols are concatenated together and then appended to a 16 microsecond (μs) Preamble (used for synchronization) and a 4 μs SIGNAL symbol (provides Rate and Length information). This completes the OFDM frame and is ready to be transmitted as an OFDM Burst by the analog mmWave FFE 202 in the mmWave domain. In the illustrated embodiment, the OFDM block of the baseband processor 204 outputs the OFDM symbol waveforms as I data and Q data.

The mmWave FFE 202 in the mmWave domain can include two digital-to-analog converters (DACs) 220, 222, corresponding low pass filters 224, 226, mixers 228, 230, and an adder 232 coupled to a power amplifier 234. The power amplifier 234 is to be coupled to an antenna (not illustrated in FIG. 2). The DAC 220, low pass filter 224, and mixer 228 correspond to the I data, and the DAC 222, low pass filter 226, and mixer 230 correspond to the Q data. The power amplifier 234 applies one or more mmWave signals to the antenna to communicate the data (i.e., information) to another wireless device.

In one embodiment, the baseband processor (not illustrated in FIG. 2) uses a digital multi-carrier modulation scheme that defines a set of data subcarriers, a set of pilot subcarriers, and a DC subcarrier to communicate data in a same single channel. The baseband processor establishes a wireless communication link with a second device on a wireless channel in a mmWave frequency range. A modulator can be coupled to the baseband processor. The modulator can include the components illustrated and described with respect to the mmWave FFE 202 in the analog domain in FIG. 2A. Alternatively, the modulator can include other components to modulate the OFDM symbols. The waveform generation controller (not illustrated in FIG. 2) determines a motion state based on RSSI and phase information as described above. The waveform generation controller can control which subcarrier structure is to be used by the baseband processor 204, including specifying a DC subcarrier, the set of data subcarriers, the set of pilot subcarriers, the set of guard band subcarriers, or the like. The waveform generation controller sends input 218 to the N-point IFFT 212 to insert null tones and guard bands. In one embodiment, the null tones and guard bands to be inserted as input 218 are specified in an OFDM parameter structure that includes parameters that control operations of the OFDM block of the baseband processor 204 in a first mode, such as in a first motion state. The waveform generation controller can change one or more of the parameters of the OFDM parameter structure to control operations of the OFDM block of the baseband processor 204 in a second mode, such as in a second motion state. The waveform generation controller can toggle between the OFDM parameters structures in a third mod, such as in a third motion state. The OFDM parameter structure can specify the set of subcarriers and the set of pilot subcarriers.

In one embodiment, the OFDM block, also referred to as OFDM PHY, uses a current data rate (e.g., 1.6 Mbps) to communicate the data in the same single channel in a first mode corresponding to the first motion state. The waveform generation controller can increase the current data rate (e.g., 2.4 Mbps) by using additional data subcarriers and a modulation scheme with more symbols. In other embodiments, other parameters of the OFDM parameter structure can be modified in one or more modes of operation to change the operations of the OFDM block accordingly. Additional details of the different subcarrier structures for the different motion states are described below with respect to FIGS. 4A-5F.

Figure 3A:
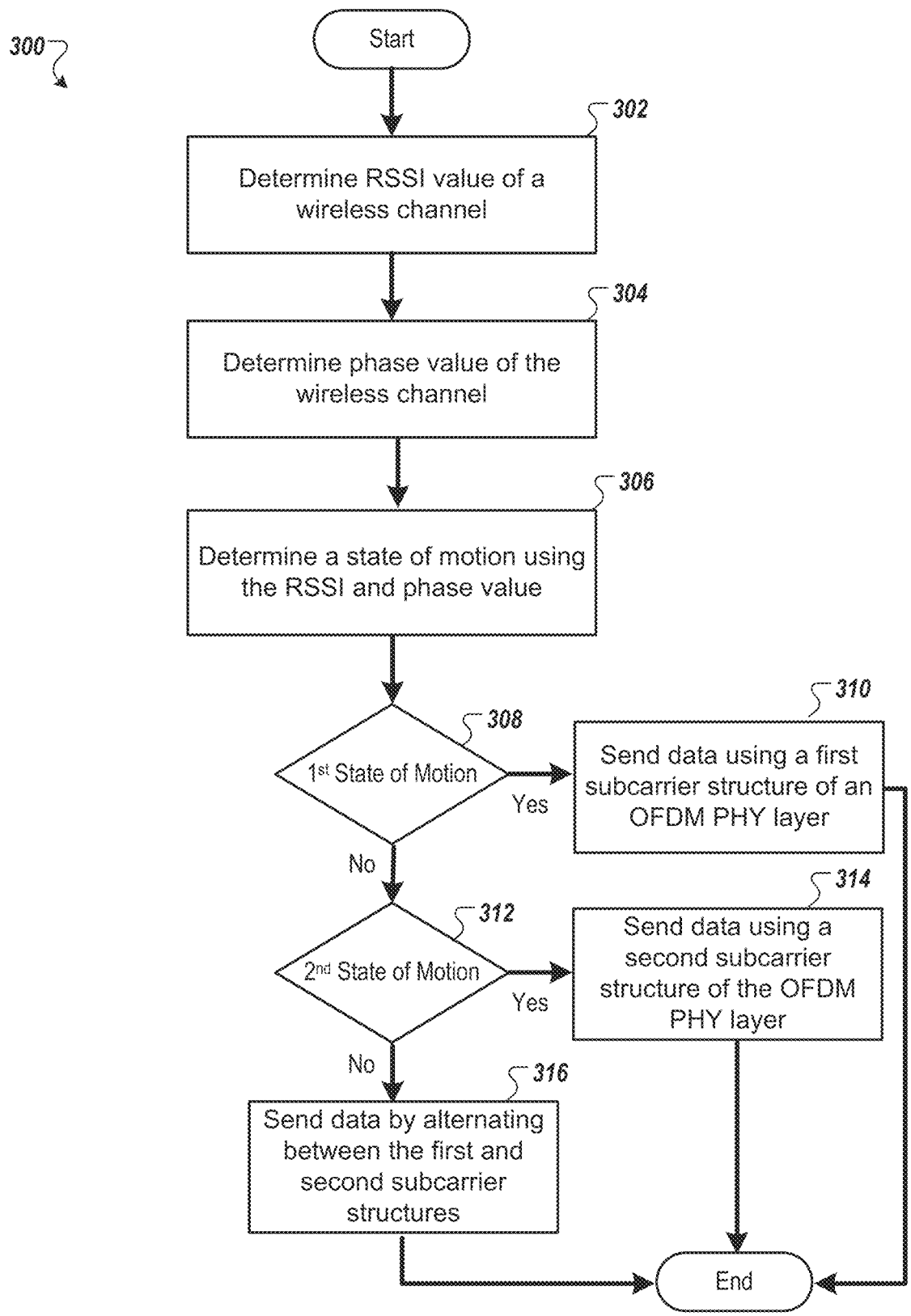
FIG. 3A is a flow diagram of a method of operating a first wireless device to communicate with a second wireless device over a wireless channel in a mmWave frequency range according to at least one embodiment.

FIG. 3A is a flow diagram of a method 300 of operating a first wireless device to communicate with a second wireless device over a wireless channel in a mmWave frequency range according to at least one embodiment. The method 300 may be implemented using processing logic comprising hardware, software, firmware, or any combination thereof. In one embodiment, the waveform generation controller 102 of FIG. 1 performs the method 300. In another embodiment, the baseband processor 106 of FIG. 1 or the baseband processor 204 of FIG. 2 performs the method 300.

Referring to FIG. 3A, the processing logic begins by a determining RSSI value associated with a wireless channel between a first wireless device and a second wireless device (block 302). The RSSI values, as a function of physical distance, are illustrated and described below with respect to FIG. 3B. The wireless channel is in the mmWave frequency range. The processing logic determines a phase value associated with the wireless channel (block 304). The phase values, as a function of physical distance, are illustrated and described below with respect to FIG. 3C. The processing logic determines a state of motion of the first wireless device using the RSSI value and the phase value (block 306). The processing logic determines if the state motion is a first state of motion (block 308). In at least one embodiment, the processing logic is in the first state of motion based on the RSSI value being with a first range and the phase value being with a second range. If in the first state of motion at block 308, the processing logic sends data to the second device using a first subcarrier structure of an OFDM PHY layer (block 310), and the method 300 ends. If not in the first state of motion at block 308, the processing logic determines if the state motion is a second state of motion (block 312). In at least one embodiment, the processing logic is in the second state of motion based on the RSSI value being with a third range greater than the first range and the phase value being either less than or greater than the second range. If in the second state of motion at block 312, the processing logic sends data to the second device using a second subcarrier structure of the OFDM PHY layer (block 314), and the method 300 ends. If not in the second state of motion at block 312, the processing logic sends the data to the second device by alternating between the first subcarrier structure and the second subcarrier structure (block 316), and the method 300 ends.

In a further embodiment, the processing logic determines the phase value at block 305 by receiving an RF signal (in the mmWave frequency range) from the second wireless device. The processing logic generates samples of the RF signal and computes an FFT of the samples to obtain amplitude information, the phase information, and the frequency information. The amplitude information can be used to determine the RSSI value and the phase information can be used to determine the phase value.

In another embodiment, the processing logic determines the first state at block 308 by determining that the RSSI value is within a first range and the phase value is within a second range. The processing logic can determine the second state at block 312 by determining that the RSSI value is within a third range greater than the first range and the phase value is either less than or greater than the second range. In at least one embodiment, the processing logic determines a third state of motion that is not the first or second. The processing logic sends the data to the second wireless device by alternating between the first subcarrier structure and the second subcarrier structure at a fixed interval at block 316. In at least one embodiment, the fixed interval is equal to a symbol duration.

Figure 3C:
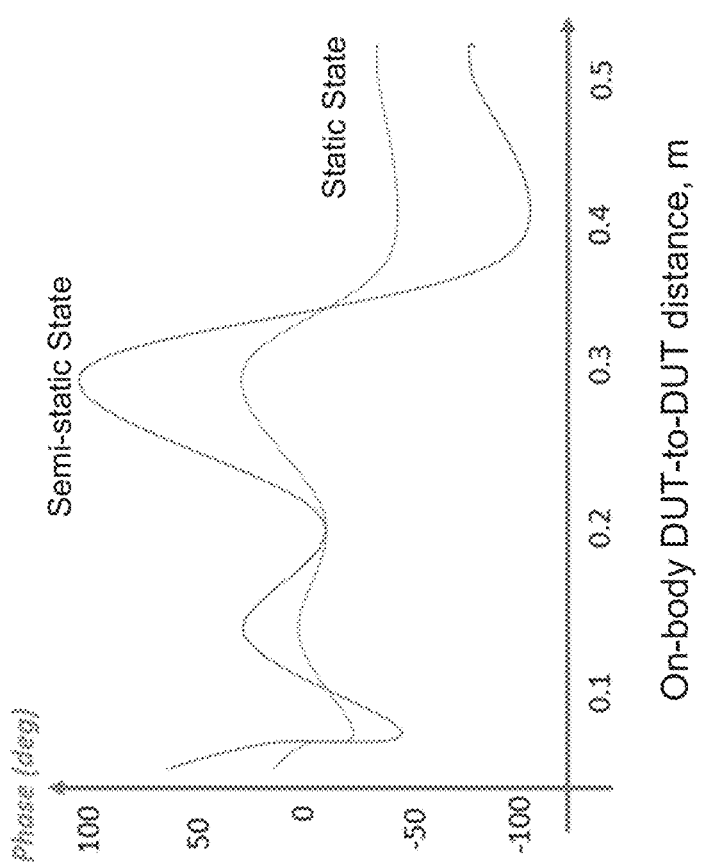
FIG. 3C is a graph of phases as a function of a physical distance between two wireless devices in a first motion state and a second motion state according to at least one embodiment.
Figure 3B:
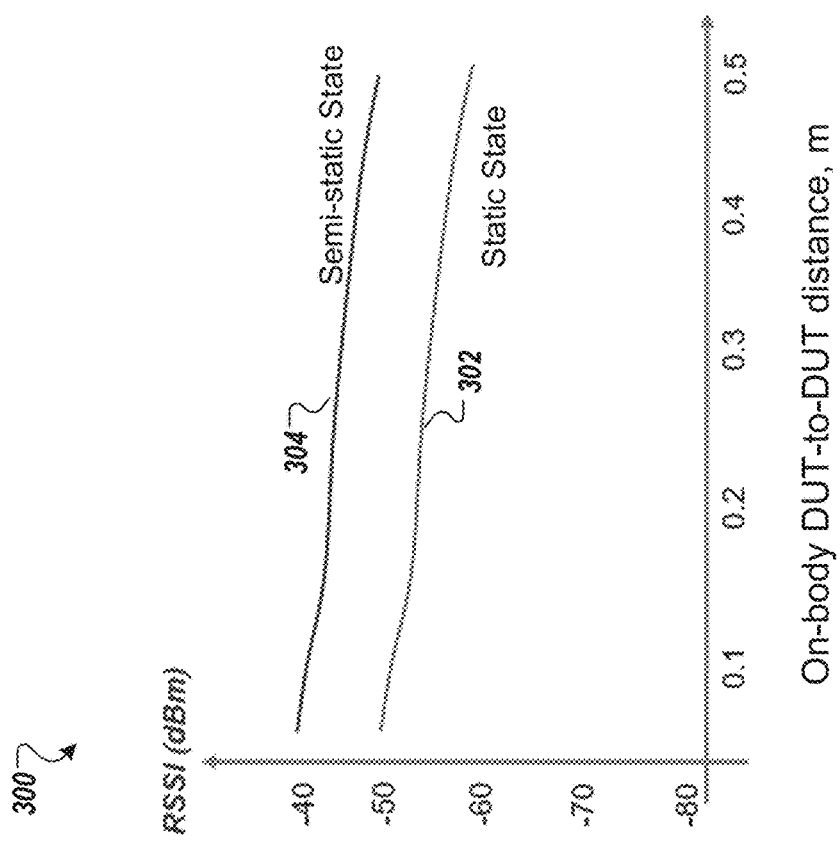
FIG. 3B is a graph of receive signal strength indicator (RSSI) values as a function of a physical distance between two wireless devices in a first motion state and a second motion state according to at least one embodiment.

FIG. 3B is a graph 300 of receive signal strength indicator (RSSI) values as a function of a physical distance between two wireless devices in a first motion state and a second motion state according to at least one embodiment. The RSSI values 302 correspond to the RSSI values measured as a function of physical distance in the first motion state (e.g., a static state). The RSSI values 304 correspond to the RSSI values measured as a function of physical distance in the second motion state (e.g., a semi-static state). The physical distance, m, is the physical distance between a first wireless device and a second wireless device. As illustrated in FIG. 3B, the RSSI values 302 are between −50 dB and −60 dB, and the RSSI values 304 are between −40 dB and −50 dB when communicating in a frequency range of 60-65 GHz. The RSSI values can be used to characterize a wireless channel in the first motion state (static state) and the second motion state (semi-static state).

FIG. 3C is a graph 350 of phases as a function of a physical distance between two wireless devices in a first motion state and a second motion state according to at least one embodiment. The phase values 352 correspond to the phase measured as a function of physical distance in the first motion state (e.g., a static state). The phase values 354 correspond to the phase measured as a function of physical distance in the second motion state (e.g., a semi-static state). As illustrated in FIG. 3C, the phase values 352 vary between −50 degrees and +50 degrees, and the phase values 354 vary between −100 degrees and +100 degrees when communicating in a frequency range of 60-65 GHz. The phase values can be used in connection with the RSSI values to characterize a wireless channel in the first motion state (static state) and the second motion state (semi-static state).

In at least one embodiment, the processing logic determines whether the first wireless device is in a first motion state (static state) when the received power (Rx-power) in terms of RSSI is within a first range between −50 dBm to −60 dBm, and the phase value is within a second range between −50 deg to +50 deg. If so, the on-body mmWave channel structure is considered to be in a static state because the user is stationary and with a first amount of movement, like a user lying down, sleeping, or the like. The processing logic determines whether the first wireless device is in a second motion state (semi-static state) when the received power (Rx-power) in terms of RSSI is within a third range between −40 dBm to −50 dBm, and the phase value is either lower or higher than the second range (e.g., lower than −50 degrees and higher than +50 degrees). If so, the on-body mmWave channel structure is considered to be in a semi-static state because the user is moving with a second amount of movement, like a user is sitting down, standing, moving arms, or the like. The processing logic determines whether the first wireless device is in a third motion state (rapid movement state) when not in the first or second state because the phase and/or RSSI values are changing rapidly. If so, the on-body mmWave channel structure is considered to be in a rapidly changing state because the user is moving with a third amount of movement, like a user is walking, running, or the like.

Figures 4A, 4B:
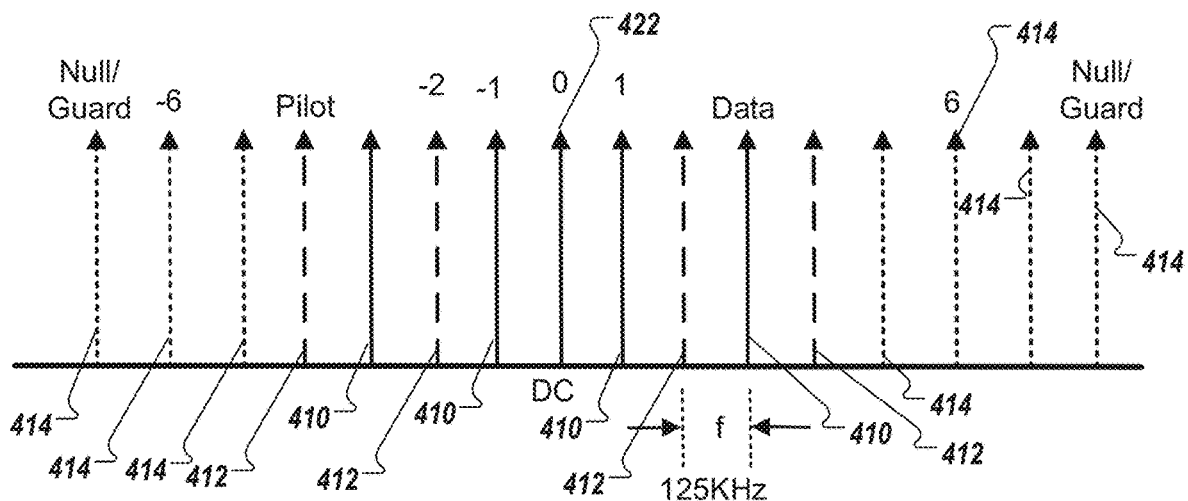
FIG. 4A is a table of a first OFDM PHY parameter structure used in a first motion state according to at least one embodiment.
FIG. 4B is a graph of signals of a first subcarrier structure used in a first motion state according to at least one embodiment.

FIG. 4A is a table of a first OFDM PHY parameter structure 400 used in a first motion state (static state) according to at least one embodiment. The first OFDM PHY parameter structure 400 includes various parameters, including, for example, a channel bandwidth 402 (e.g., 2 MHz), an IFFT/FFT size 404 (e.g., 16), an IFFT/FFT clock 406 (e.g., 2 MHz), a subcarrier spacing 408 (e.g., 125 kHz), a number of data subcarriers 410 (e.g., 4), a number of pilot subcarriers 412 (e.g., 4), a number of guard band subcarriers 414 (e.g., three left guard band subcarriers and four right guard band carriers), a modulation scheme 416 (e.g., 4-QAM/QPSK, 2-QAM/BPSK), an OFDM symbol duration 418 (e.g., 8 microseconds), and a channel coding 420 (e.g., 0). The first OFDM PHY parameter structure 400 can also specify a total bandwidth, an operating bandwidth, information rate, a coding rate, a total number of subcarriers, and a DC subcarrier. The first OFDM PHY parameter structure 400 can be defined such that the different subcarriers are indexed according to frequency indexes, such as illustrated in FIG. 4B.

FIG. 4B is a graph 450 of signals of a first subcarrier structure used in a first motion state according to at least one embodiment. The first subcarrier structure can be defined by the first OFDM PHY parameter structure 400 of FIG. 4A. The number of data subcarriers 410 can be indexed according to a frequency index relative to a DC subcarrier 422 at index 0, such as at −3, −1, +1, and +3. The number of pilot subcarriers 412 can be indexed according to a frequency index, such as −4, −2, +2, and +4. The three left guard band subcarriers can be indexed according to a frequency index, such as at −7, −6, and −5. The three left guard band subcarriers are a lower frequency index than the DC subcarrier 422 at index 0. The four right guard band subcarriers can be indexed according to a frequency index, such as at +5, +6, +7, and +8. The four right guard band subcarriers are a higher frequency index than the DC subcarrier 422 at index 0. The DC subcarrier 422 can be put at the zero index and is usually nulled. Similarly, the number of guard band subcarriers 414 can be nulled. The four data subcarriers 412 can be modulated using 4-QAM or QPSK, such as illustrated in FIG. 4C.

In at least one embodiment, the first subcarrier structure includes: a DC subcarrier 422 (index 0), a first data subcarrier 410 at a first frequency higher than the DC subcarrier 422 (index+1); a first pilot subcarrier 412 at a second frequency higher than the first frequency (index+2); a second data subcarrier 410 at a third frequency higher than the second frequency (index+3; a second pilot subcarrier 412 at a fourth frequency higher than the third frequency (index+4); a third data subcarrier 410 at a fifth frequency less than the DC subcarrier (index −1); a third pilot subcarrier 412 at a sixth frequency less than the fifth frequency (index −2); a fourth data subcarrier 410 at a seventh frequency less than the sixth frequency (index −3); and a fourth pilot subcarrier 412 at an eighth frequency less than the seventh frequency (index −4). In a further embodiment, the first subcarrier structure further includes four guard band subcarriers 414 at frequencies higher than the fourth frequency (indexes+5, +6, +7, +8); and three guard band subcarriers 414 at frequencies less than the eighth frequency (indexes −5, −6, −8). In another embodiment, the first subcarrier structure includes a first set of guard band subcarriers, some at frequencies less than the four pilot subcarriers and some at frequencies greater than the four pilot subcarriers.

As shown in FIG. 4B, one of the four data subcarriers 410 is indexed between each of the four pilot subcarriers 412 or the DC subcarrier 422. In particular, the first subcarrier structure includes alternating data subcarriers and pilot signals in both directions from the DC subcarrier 422. Although four data subcarriers and four pilot subcarriers are used, in other embodiments, other even numbers of data subcarriers and even numbers of pilot subcarriers can be used in a one-to-one alternating manner.

Figure 4C:
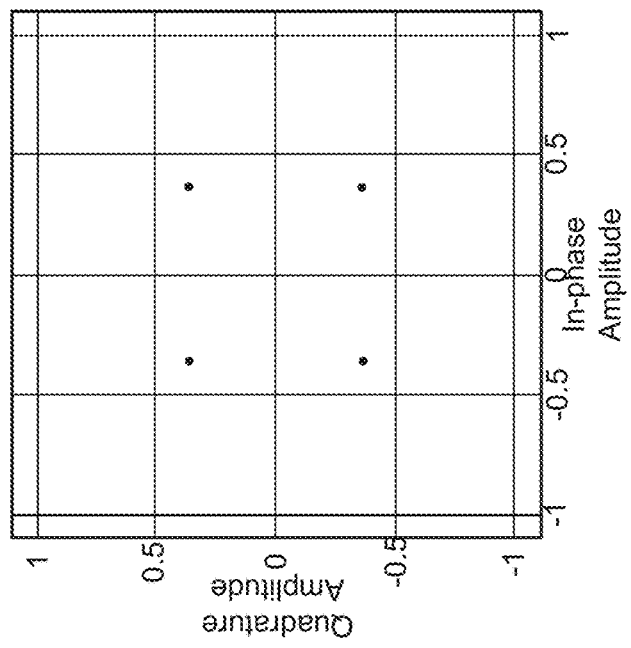
FIG. 4C is a constellation diagram of a first constellation mapping scheme used in a first motion state according to at least one embodiment.
Figure 4D:
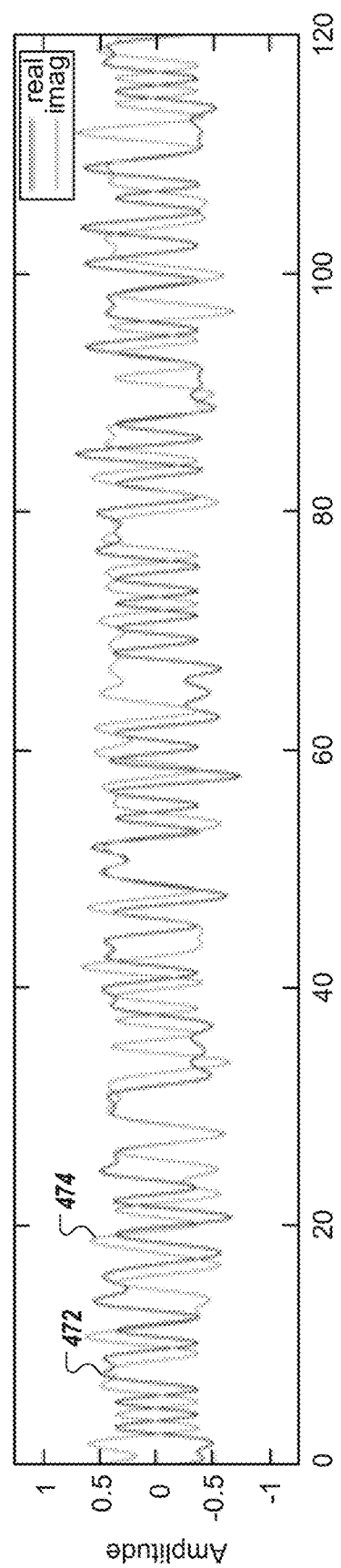
FIG. 4D is a waveform diagram of a first in-phase (I) signal and a first quadrature signal (Q) used in a first motion state with a first modulation scheme according to at least one embodiment.

FIG. 4C is a constellation diagram 460 of a first constellation mapping scheme used in a first motion state according to at least one embodiment. The constellation diagram 460 is a representation of a signal modulated by 4-QAM or QPSK and includes four constellation points organized in a square, each corresponding to an amplitude and a phase. Each symbol is encoded as a different combination of amplitude and phase of the carrier so that each symbol is represented by a point on the constellation diagram 460. Using the first constellation mapping scheme, the symbols can be converted to I and Q signal waveforms, such as illustrated in FIG. 4D. Each symbol can be represented as a complex number, with the horizontal axis representing the I component (real component) and the vertical axis representing the Q component (imaginary component) of the baseband signal.

FIG. 4D is a waveform diagram 470 of a first in-phase (I) signal 472 and a first quadrature (Q) signal 474 used in a first motion state with a first modulation scheme (4-QAM, QPSK) according to at least one embodiment.

Figure 4E:
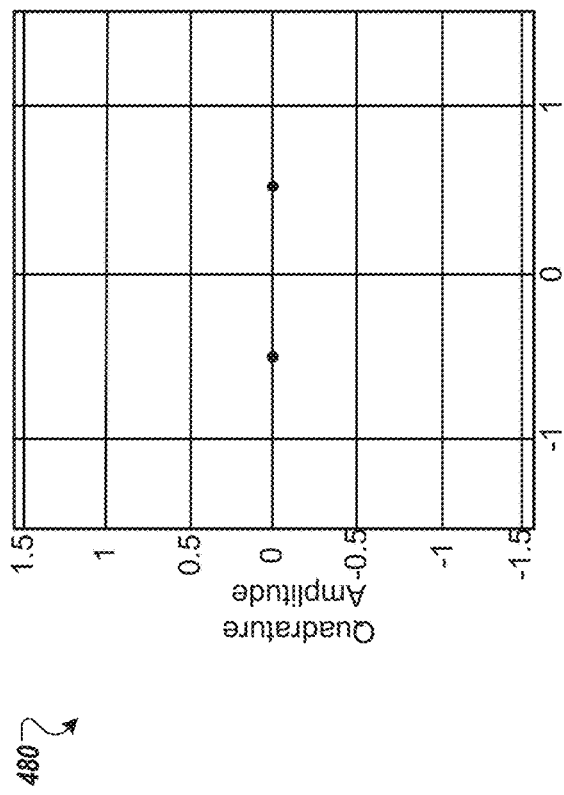
FIG. 4E is a constellation diagram of a second constellation mapping scheme used in the first motion state according to at least one embodiment.
Figure 4F:
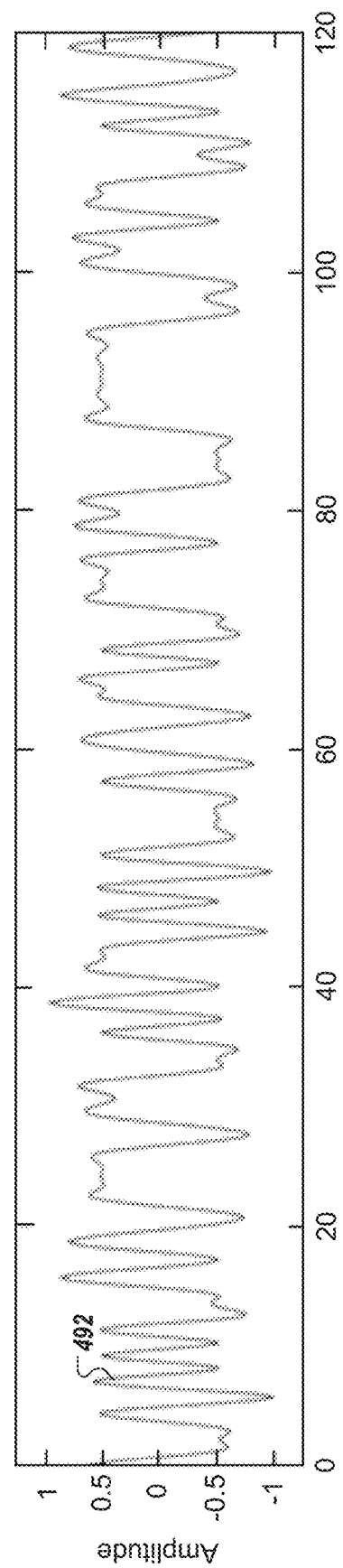
FIG. 4F is a waveform diagram of an in-phase (I) signal used in the first motion state according to at least one embodiment.

As described above, different modulation schemes can be used for the first motion state. FIGS. 4C-4D correspond to a first modulation scheme of 4-QAM or QPSK. FIGS. 4E-4F correspond to a second modulation scheme of 2-QAM or binary phase-shift keying (BPSK).

FIG. 4E is a constellation diagram 480 of a second constellation mapping scheme used in the first motion state according to at least one embodiment. The constellation diagram 480 is a representation of a signal modulated by 2-QAM or BPSK and includes two constellation points organized in a line, each corresponding to an in-phase amplitude. The symbols can be converted to an I signal waveform using the second constellation mapping scheme, such as illustrated in FIG. 4F.

FIG. 4F is a waveform diagram 490 of an in-phase (I) signal 492 used in the first motion state with a second modulation scheme (2-QAM, BPSK) according to at least one embodiment. In at least one embodiment, the first subcarrier structure uses a first QAM scheme with a first number of modulation states (e.g., 4). In at least one embodiment, the first subcarrier structure uses a second QAM scheme with a second number of modulation states (e.g., 2). In at least one embodiment, the first subcarrier structure does not use channel coding.

The embodiments described above are directed to the signal generation in the first motion state (static state) in which the first subcarrier structure is used. The embodiments described below are directed to the signal generation in the second motion state (semi-static state).

Figures 5A, 5B:
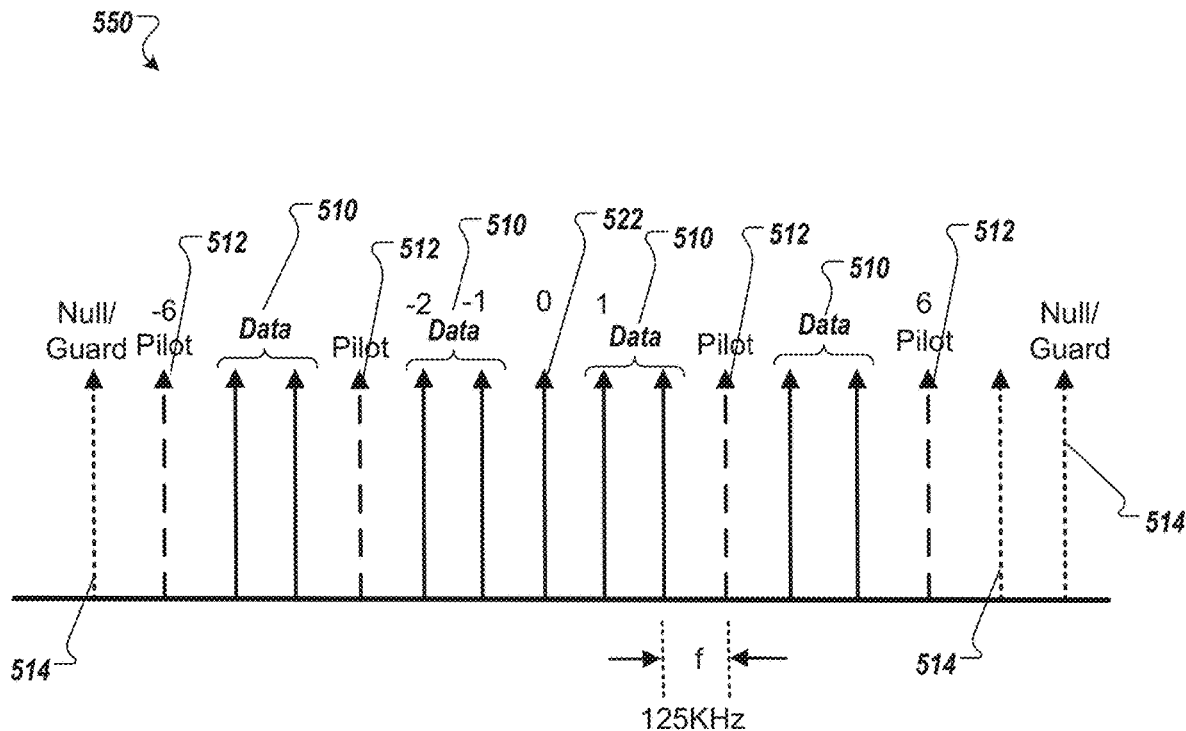
FIG. 5A is a table of a second OFDM PHY parameter structure used in a second motion state according to at least one embodiment.
FIG. 5B is a graph of signals of a baseband subcarrier structure used in a second motion state according to at least one embodiment.

FIG. 5A is a table of a second OFDM PHY parameter structure 500 used in a second motion state (semi-static state) according to at least one embodiment. The second OFDM PHY parameter structure 500 includes various parameters, including, for example, a channel bandwidth 502 (e.g., 2 MHz), an IFFT/FFT size 504 (e.g., 16), an IFFT/FFT clock 506 (e.g., 2 MHz), a subcarrier spacing 508 (e.g., 125 kHz), a number of data subcarriers 510 (e.g., 8), a number of pilot subcarriers 512 (e.g., 4), a number of guard band subcarriers 514 (e.g., one left guard band subcarrier and two right guard band carriers), a modulation scheme 516 (e.g., 8-QAM), an OFDM symbol duration 518 (e.g., 8 microseconds), and a channel coding 520 (e.g., BCC, ½). The second OFDM PHY parameter structure 500 can also specify a total bandwidth, an operating bandwidth, information rate, a coding rate, a total number of subcarriers, and a DC subcarrier. The second OFDM PHY parameter structure 500 can be defined such that the different subcarriers are indexed according to frequency indexes, such as illustrated in FIG. 5B.

FIG. 5B is a graph 550 of signals of a second subcarrier structure used in a second motion state according to at least one embodiment. The second subcarrier structure can be defined by the second OFDM PHY parameter structure 500 of FIG. 5A. The number of data subcarriers 510 can be indexed according to a frequency index relative to a DC subcarrier 522 at index 0, such as at −5, −4, −2, −1, +1, +2, +4, and +5. The number of pilot subcarriers 512 can be indexed according to a frequency index, such as −6, −3, +3, and +6. The one left guard band subcarrier can be indexed according to a frequency index, such as at −7. The one left guard band subcarrier is a lower frequency index than the DC subcarrier 522 at index 0. The two right guard band subcarriers can be indexed according to a frequency index, such as at +7, and +8. The two right guard band subcarriers are a higher frequency index than the DC subcarrier 522 at index 0. The DC subcarrier 522 can be put at the zero index and is usually nulled. Similarly, the number of guard band subcarriers 514 can be nulled. The eight data subcarriers 512 can be modulated using 8-QAM, such as illustrated in FIG. 5C.

In at least one embodiment, the second subcarrier structure includes a DC subcarrier 522; a first pair of data subcarriers 510 at a first pair of frequencies higher than the DC subcarrier (indexes+1, +2); a first pilot subcarrier 512 at a first frequency higher than the first pair of frequencies (index+3); a second pair of data subcarriers 510 at a second pair of frequencies higher than the second frequency (indexes+4, +5); a second pilot subcarrier 512 at a second frequency higher than the second pair of frequencies (index 6); a third pair of data subcarriers 510 at a third pair of frequencies less than the DC subcarrier (indexes −1, −2); a third pilot subcarrier 512 at a third frequency less than the third pair of frequencies (index −3); a fourth pair of data subcarriers 510 at a fourth pair of frequencies less than the third frequency (indexes −4, −5); and a fourth pilot subcarrier 512 at a fourth frequency less than the fourth pair of frequencies (index −6). In a further embodiment, the second subcarrier structure further includes two guard band subcarriers 514 at frequencies higher than the second frequency (index+7, +8); and one guard band subcarrier 514 at frequencies less than the fourth frequency (index −7). In another embodiment, the second subcarrier structure includes a second set of guard band subcarriers, some at frequencies less than the four pilot subcarriers and some at frequencies greater than the four pilot subcarriers.

As shown in FIG. 5B, two of the eight data subcarriers 510 are indexed between the four pilot subcarriers 512 or the DC subcarrier 522. In particular, the second subcarrier structure includes alternating pairs of data subcarriers and a pilot signal in both directions from the DC subcarrier 522. Although eight data subcarriers and four pilot subcarriers are used, in other embodiments, other even numbers of data subcarriers and even numbers of pilot subcarriers can be used in a two-to-one alternating manner.

Figure 5C:
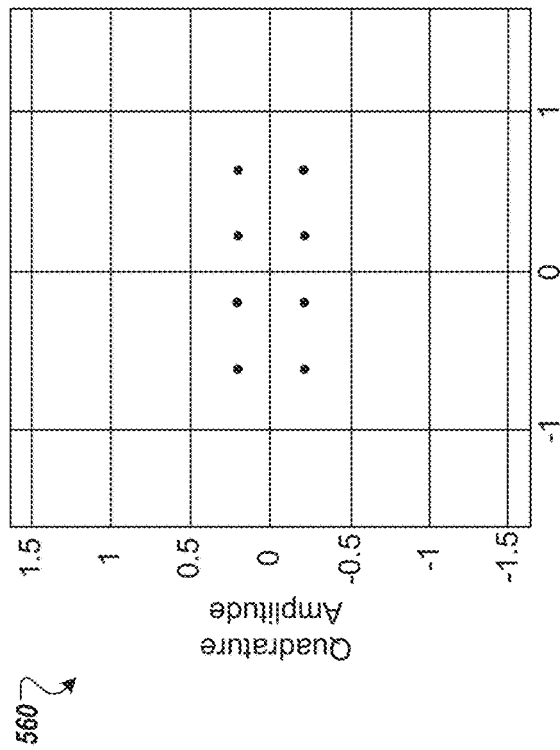
FIG. 5C is a constellation diagram of a second constellation mapping scheme used in a second motion state according to at least one embodiment.
Figure 5D:
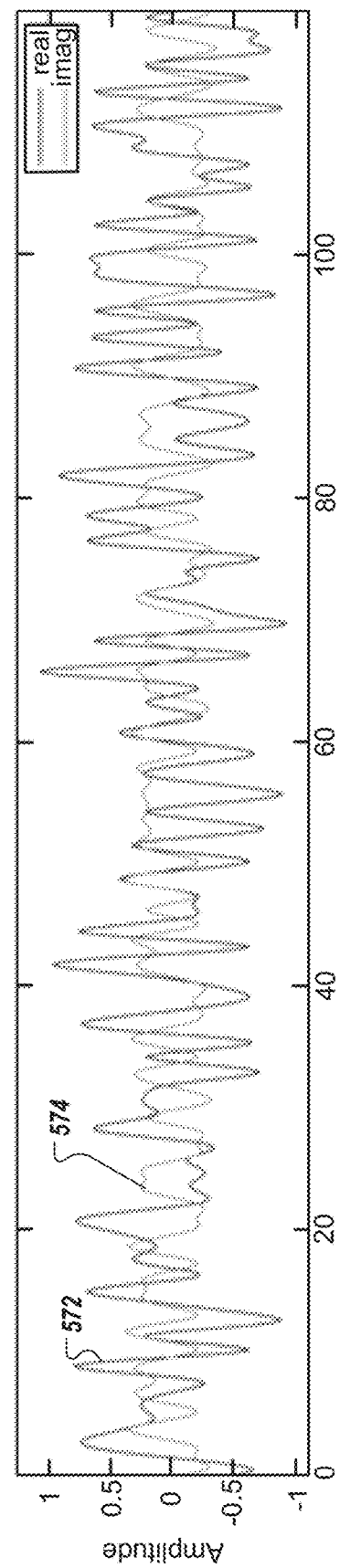
FIG. 5D is a waveform diagram of a third in-phase (I) signal and a third quadrature signal (Q) used in a second motion state according to at least one embodiment.

FIG. 5C is a constellation diagram 560 of a third constellation mapping scheme used in a second motion state according to at least one embodiment. The constellation diagram 560 is a representation of a signal modulated by 8-QAM and includes eight constellation points organized in a rectangle, each corresponding to an amplitude and a phase. Each symbol is encoded as a different combination of amplitude and phase of the carrier so that each symbol is represented by a point on the constellation diagram 560. The symbols can be converted to I and Q signal waveforms using the third constellation mapping scheme, such as illustrated in FIG. 5D. Each symbol can be represented as a complex number, with the horizontal axis representing the I component (real component) and the vertical axis representing the Q component (imaginary component) of the baseband signal.

FIG. 5D is a waveform diagram 570 of a second in-phase (I) signal 572 and a second quadrature (Q) signal 574 used in a second motion state with a third modulation scheme (8-QAM) according to at least one embodiment.

In at least one embodiment, the second subcarrier structure uses a second QAM scheme with a second number of modulation states (e.g., 8). In at least one embodiment, the second subcarrier structure uses a second QAM scheme with a second number of modulation states (e.g., 2). In at least one embodiment, the second subcarrier structure uses channel coding at a specified rate (e.g., BCC, 12).

In one embodiment, the OFDM PHY parameter structures described above can be used to control an N-point IFFT digital block, where N is equal to a number of data subcarriers. The baseband processor modifies the first parameter information to the second parameter information according to the parameter structure being used for the particular motion state. The baseband processor can also insert a specified number of null tones into the N-point IFFT digital block. In another embodiment, the indexes of specific subcarriers to be nulled can be input into the N-point IFFT digital block, such as done with the DC subcarrier. In another embodiment, the baseband processor modifies the first parameter information to the second parameter information by applying the different data subcarrier structures as described above. In other embodiments, the baseband processor modifies the first parameter information to the second parameter information by modifying other parameters in the OFDM PHY parameter structure, such as the modulation scheme or channel coding.

The embodiments described above are directed to the signal generation in the second motion state (semi-static state) in which the second subcarrier structure is used. The embodiments described below are directed to the signal generation in the third motion state (dynamic state) in which the first and second subcarrier structures are used in an alternating fashion.

Figure 6:
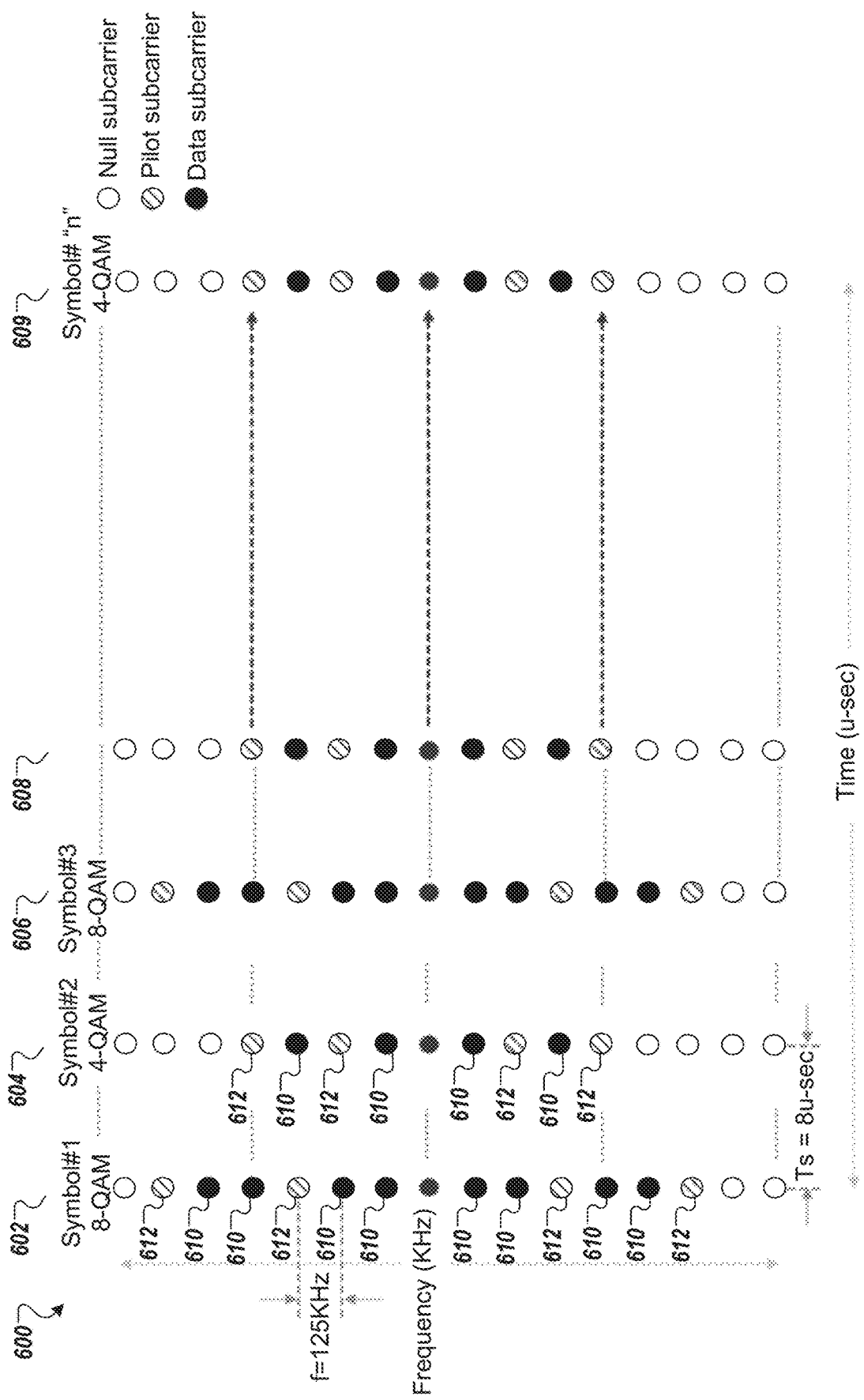
FIG. 6 illustrates adaptive OFDM baseband transmissions used in a third motion state according to at least one embodiment.

FIG. 6 illustrates adaptive OFDM baseband transmissions 600 used in a third motion state according to at least one embodiment. At a first time 602, the adaptive OFDM baseband transmissions 600 communicates a first symbol using the first subcarrier structure. As illustrated in FIG. 6, the first subcarrier structure includes null subcarriers, four pilot subcarriers 612, and eight data subcarriers 610. After a fixed interval (e.g., 8 microseconds) at a second time 604, the adaptive OFDM baseband transmissions 600 communicates a second symbol using the second subcarrier structure. As illustrated in FIG. 6, the second subcarrier structure includes null subcarriers, four pilot subcarriers 612, and four data subcarriers 610. After a fixed interval (e.g., 8 microseconds) at a third time 606, the adaptive OFDM baseband transmissions 600 communicates a third symbol using the first subcarrier structure. After a fixed interval (e.g., 8 microseconds) at a second time 608, the adaptive OFDM baseband transmissions 600 communicates a fourth symbol using the second subcarrier structure. The adaptive OFDM baseband transmissions 600 continues until an Nth symbol is communicated using the second subcarrier structure at an Nth time 609, where N is a positive even integer greater than two.

Figure 7:
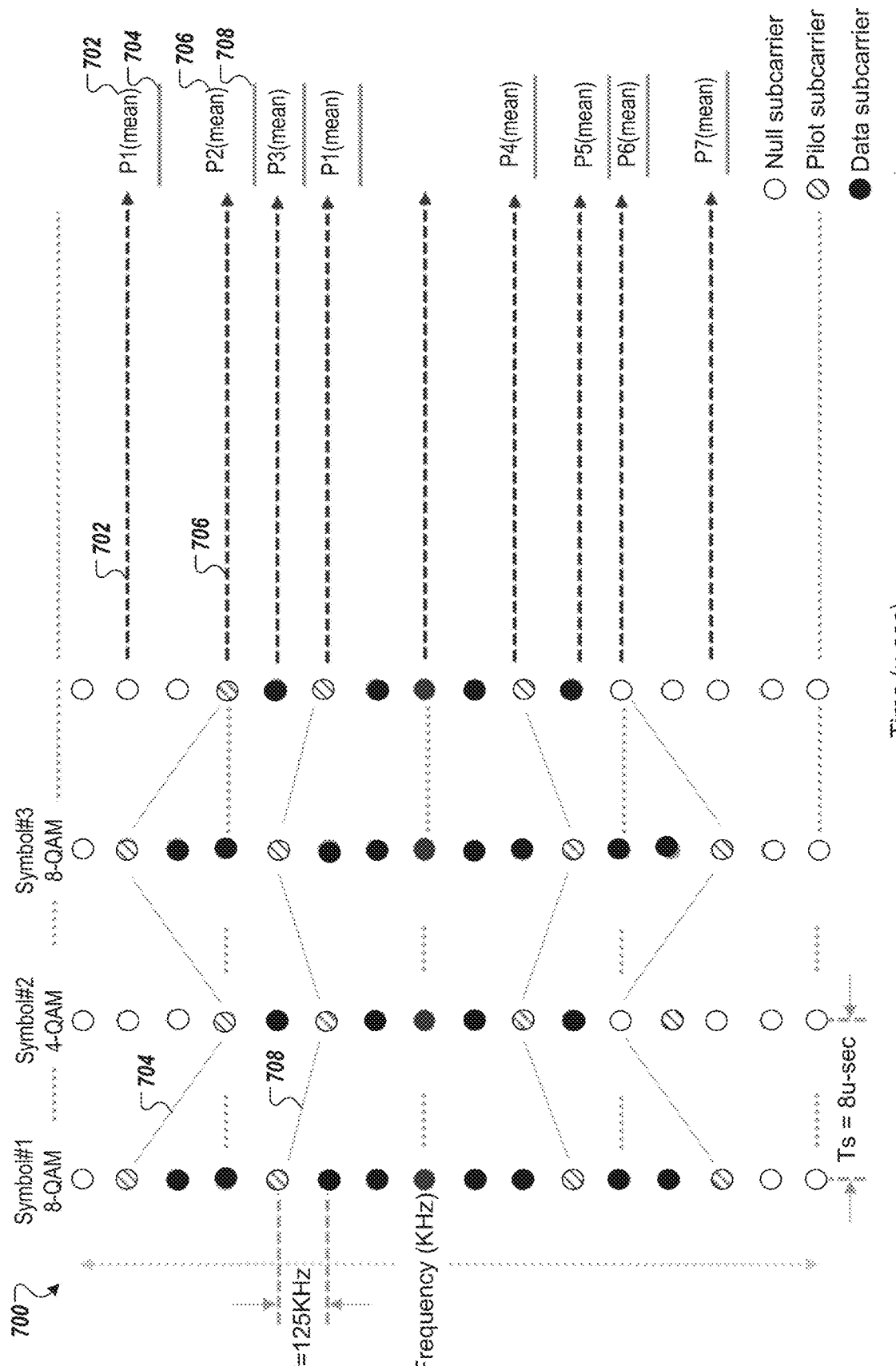
FIG. 7 illustrates adaptive OFDM baseband transmissions used in a third motion state according to at least one embodiment.

FIG. 7 illustrates adaptive OFDM baseband transmissions 700 used in a third motion state according to at least one embodiment. In the adaptive OFDM baseband transmissions 700, each symbol can be alternated between using the first subcarrier structure and the second subcarrier structure in a pilot carrier pattern design. For the pilot carrier pattern design, a first pilot estimate (Pn(mean) and a second power estimate (Pm(mean) can be calculated. The first pilot estimate (Pn(mean) is a time average computed across pilot subcarriers containing pilot symbols (BPSK), resulting in a column vector containing an average amplitude and phase. The second power estimate (Pm(mean) is computed across pilot subcarriers in the frequency domain, resulting in a row vector containing an average amplitude and phase. Correction factors (amplitude and phase factors) are computed and applied to the data subcarriers based on the pilot estimates.

Figure 8A:
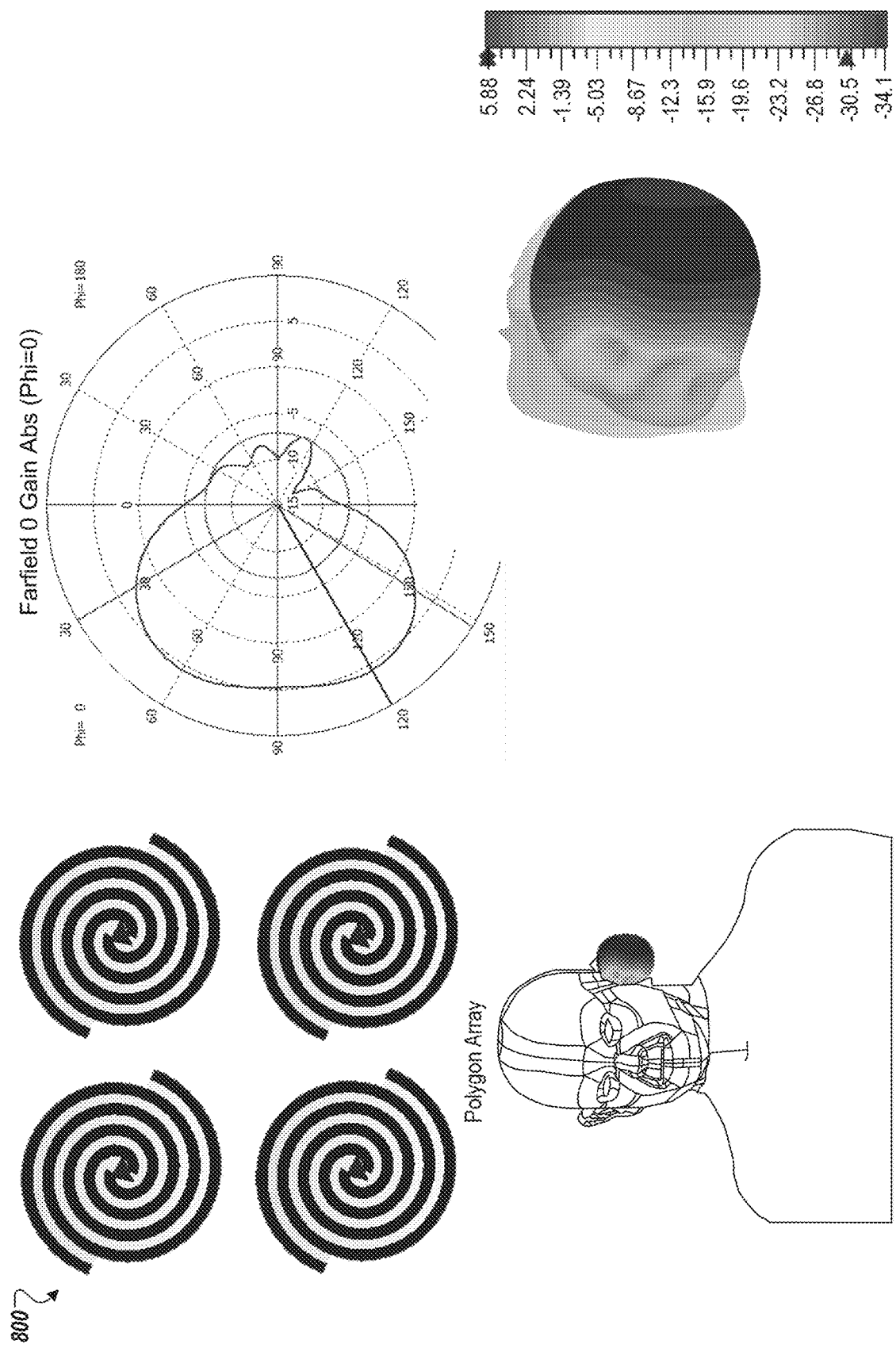
FIG. 8A illustrates a polarization-agnostic, wide-band antenna array system with uniform radiation pattern and array gain for mmWave human-body channel structure in a mmWave frequency band according to at least one embodiment.

FIG. 8A illustrates a polarization-agnostic, wide-band antenna array system 800 with uniform radiation pattern and array gain for mmWave human-body channel structure in a first mmWave frequency band according to at least one embodiment. The antenna array system 800 includes four antenna elements organized in a square shape, and each antenna element is positioned at a vertex of the square shape. The antenna array system 800 operates at a first frequency range of 30 GHz (e.g., approximately 24.2-29.5 GHz). In general, mmWave array systems at 26 & 60-GHz need Circularly Polarized (CP) radiation pattern characteristics to be agnostic of scattering or diffraction-related polarization mismatch loss between a transmitter and a receiver. The CP radiation combines both vertical and horizontal polarized Electric field components with an offset being less than 3 dB (e.g., <3-dB), which is quantified as an axial ratio.

Figure 8B:
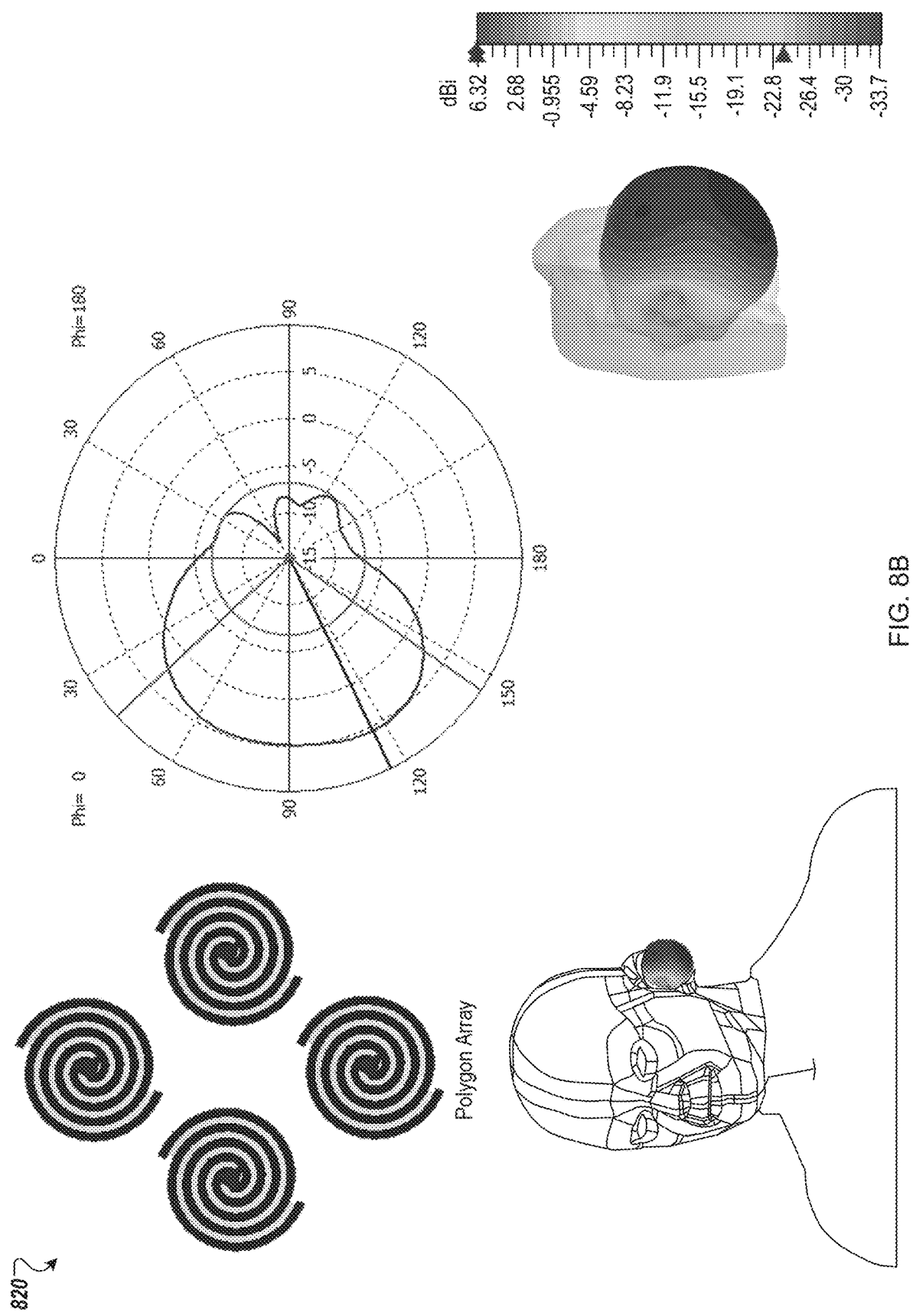
FIG. 8B illustrates a polarization-agnostic, wide-band antenna array system with uniform radiation pattern and array gain for mmWave human-body channel structure in a first mmWave frequency band according to at least one embodiment.

FIG. 8B illustrates a polarization-agnostic, wide-band antenna array system 820 with uniform radiation pattern and array gain for mmWave human-body channel structure in a first mmWave frequency band according to at least one embodiment. The antenna array system 820 includes four antenna elements organized in a diamond shape, and each antenna element is positioned at a vertex of the diamond shape. The antenna array system 820 operates at the first frequency range of 30 GHz (e.g., approximately 24.2-29.5 GHz).

Figure 8C:
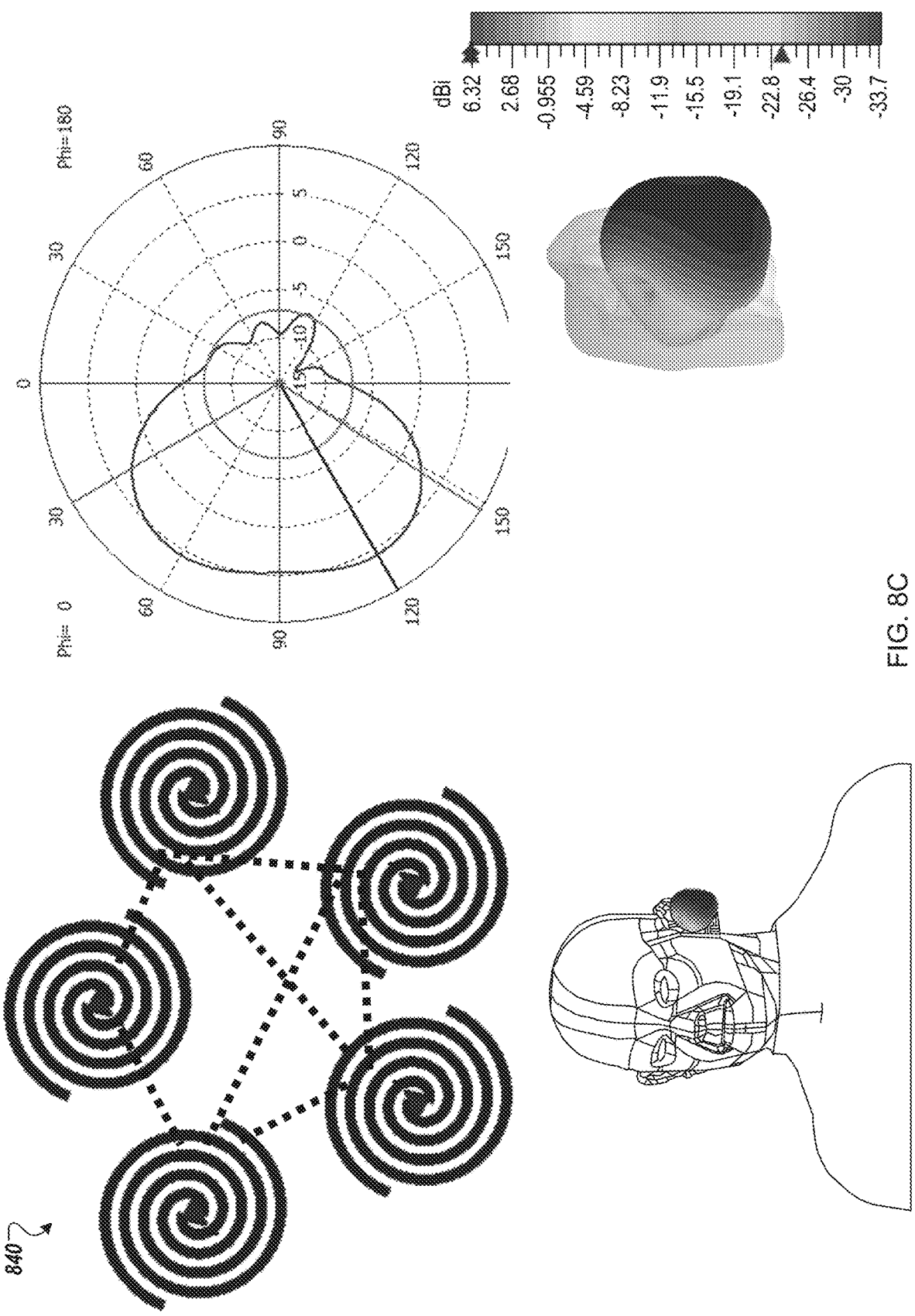
FIG. 8C illustrates a polarization-agnostic, wide-band antenna array system with uniform radiation pattern and array gain for mmWave human-body channel structure in a first mmWave frequency band according to at least one embodiment.

FIG. 8C illustrates a polarization-agnostic, wide-band antenna array system 840 with uniform radiation pattern and array gain for mmWave human-body channel structure in a first mmWave frequency band according to at least one embodiment. The antenna array system 840 includes five antenna elements organized in a pentagon shape, and each antenna element is positioned at a vertex of the pentagon shape. The antenna array system 840 operates at the first frequency range of 30 GHz (e.g., approximately 24.2-29.5 GHz).

The antenna array systems 800, 820, and 840 have an EIRP or array gain of 6 dBic and a field-of-view (FOV) of 90 degrees. The performance is based on array configurations, independent of antenna element design and physical and industrial design (PD/ID) form factors.

Figure 9A:
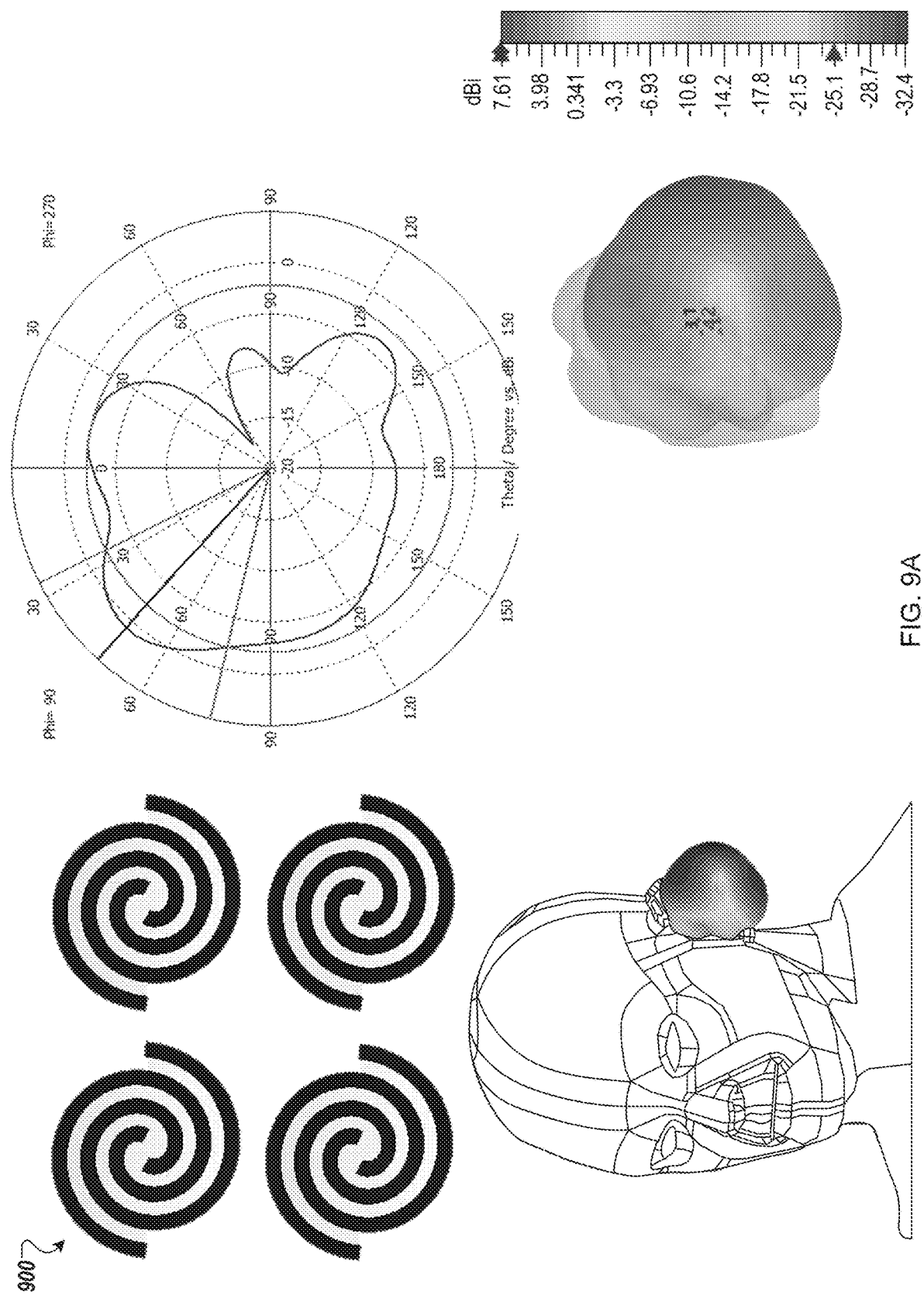
FIG. 9A illustrates a polarization-agnostic, wide-band antenna array system with uniform radiation pattern and array gain for mmWave human-body channel structure in a second mmWave frequency band according to at least one embodiment.

FIG. 9A illustrates a polarization-agnostic, wide-band antenna array system 900 with uniform radiation pattern and array gain for mmWave human-body channel structure in a second mmWave frequency band according to at least one embodiment. The antenna array system 900 includes four antenna elements organized in a square shape, and each antenna element is positioned at a vertex of the square shape. The antenna array system 900 operates at a second frequency range of 60 GHz (e.g., approximately 57-64 GHz). In general, mmWave array systems at 26 & 60-GHz need Circularly Polarized (CP) radiation pattern characteristics to be agnostic of scattering or diffraction-related polarization mismatch loss between a transmitter and a receiver. The CP radiation combines both vertical and horizontal polarized Electric field components with an offset being less than 3 dB (e.g., <3-dB), which is quantified as an axial ratio.

Figure 9B:
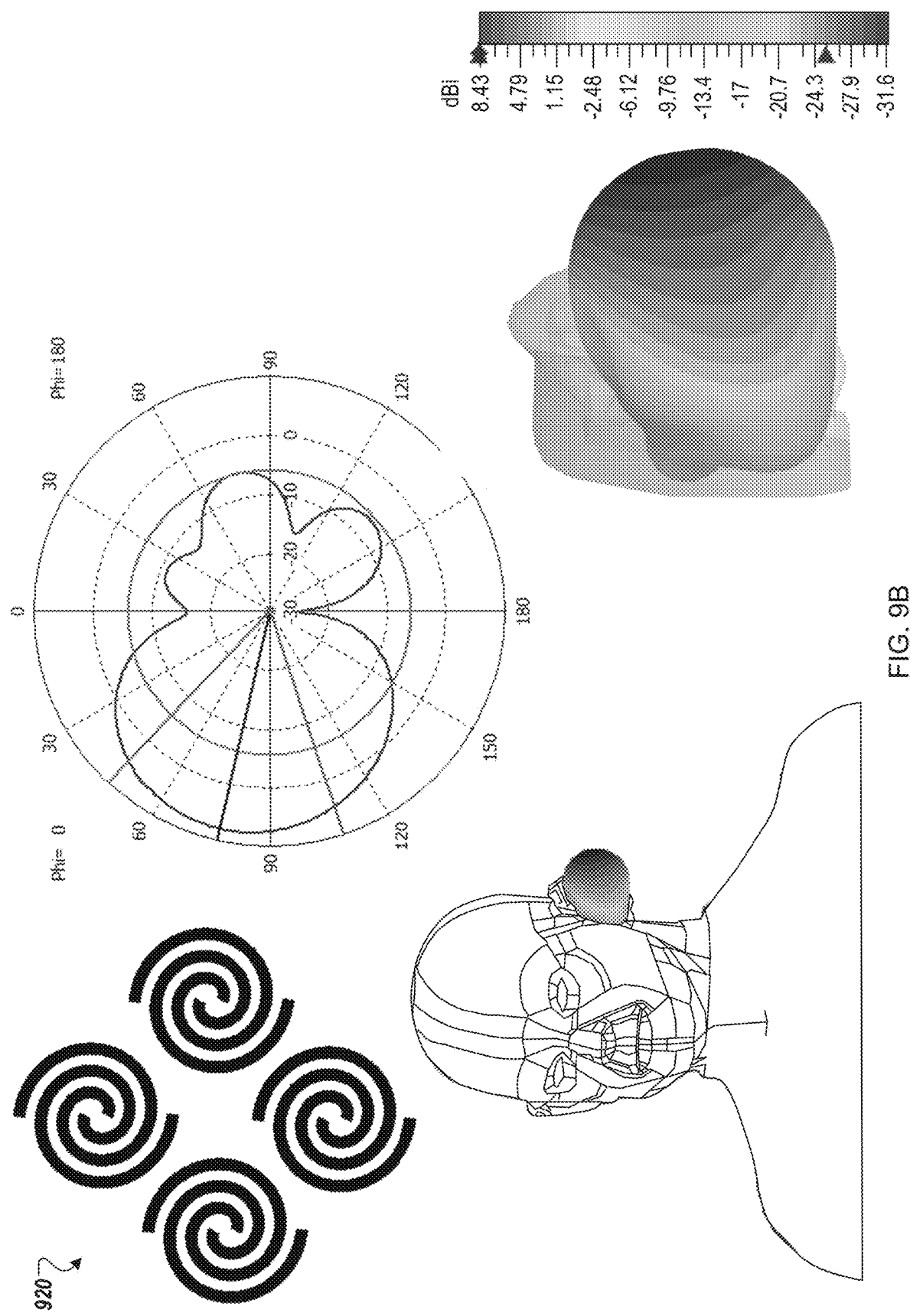
FIG. 9B illustrates a polarization-agnostic, wide-band antenna array system with uniform radiation pattern and array gain for mmWave human-body channel structure in a second mmWave frequency band according to at least one embodiment.

FIG. 9B illustrates a polarization-agnostic, wide-band antenna array system 920 with uniform radiation pattern and array gain for mmWave human-body channel structure in a second mmWave frequency band according to at least one embodiment. The antenna array system 920 includes four antenna elements organized in a diamond shape, and each antenna element is positioned at a vertex of the diamond shape. The antenna array system 920 operates at the second frequency range of 60 GHz (e.g., approximately 57-64 GHz).

Figure 9C:
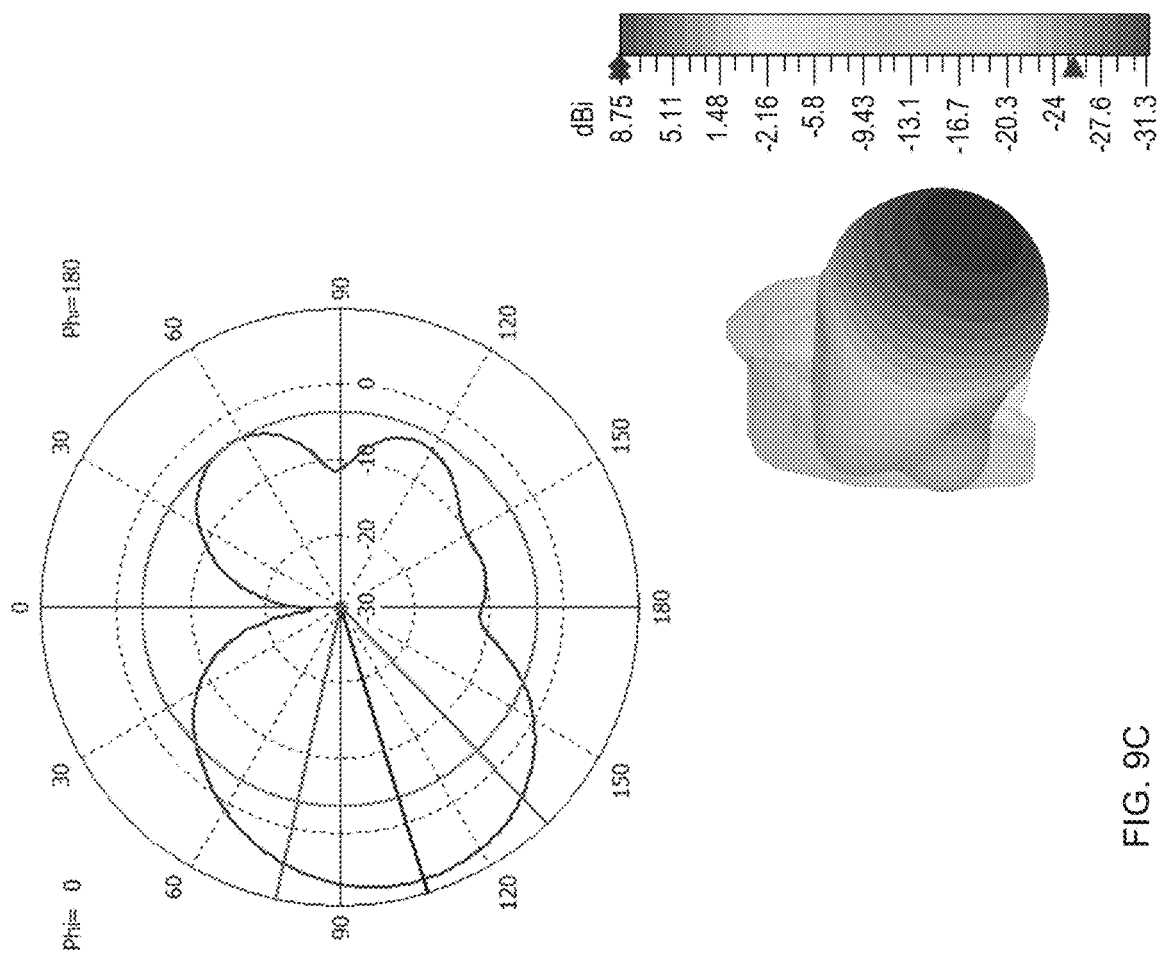
FIG. 9C illustrates a polarization-agnostic, wide-band antenna array system with uniform radiation pattern and array gain for mmWave human-body channel structure in a second mmWave frequency band according to at least one embodiment.
Figure 9C:
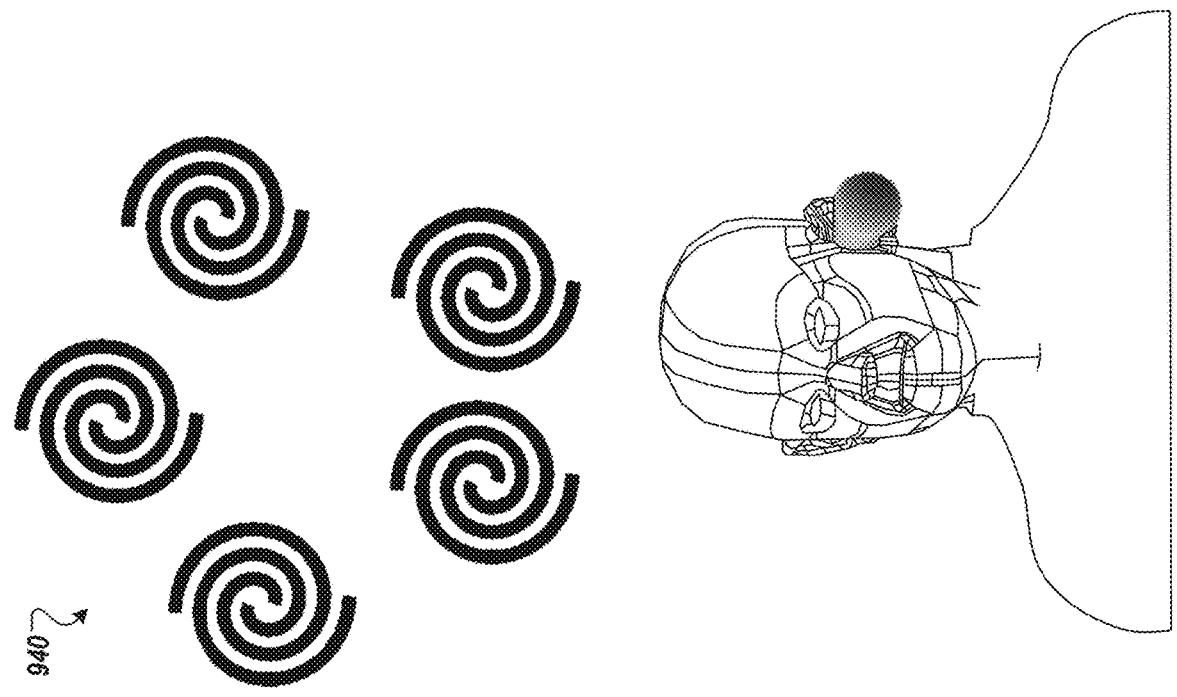

FIG. 9C illustrates a polarization-agnostic, wide-band antenna array system 840 with uniform radiation pattern and array gain for mmWave human-body channel structure in a second mmWave frequency band according to at least one embodiment. The antenna array system 840 includes five antenna elements organized in a pentagon shape, and each antenna element is positioned at a vertex of the pentagon shape. The antenna array system 840 operates at the second frequency range of 60 GHz (e.g., approximately 57-64 GHz).

The antenna array systems 900, 920, and 940 have an EIRP or array gain of 8 dBic and a field-of-view (FOV) of 80 degrees. The performance is based on array configurations, independent of antenna element design and physical and industrial design (PD/ID) form factors.

Figure 10:
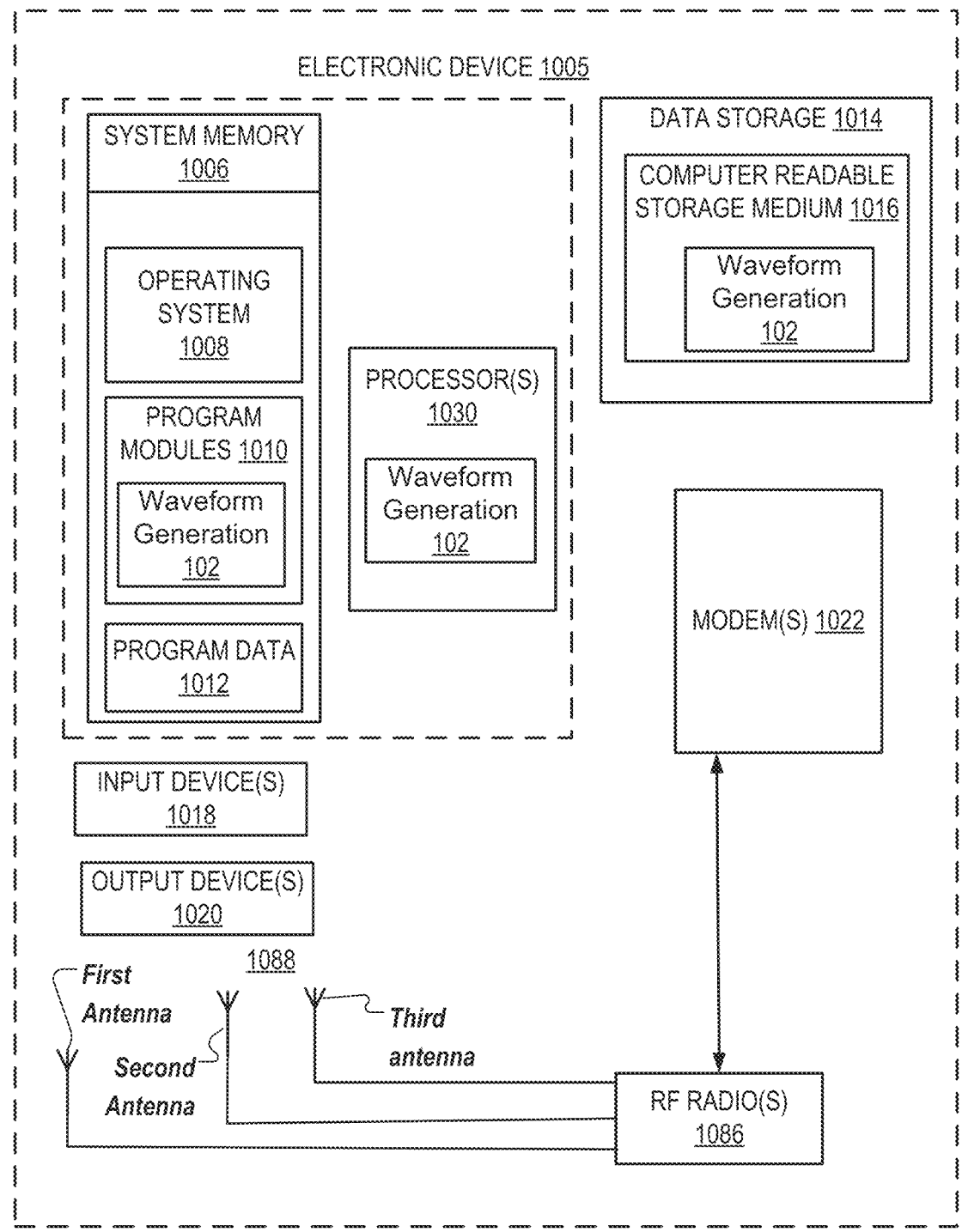
FIG. 10 is a block diagram of an electronic device in which embodiments of waveform generation based on motion states may be implemented.

FIG. 10 is a block diagram of an electronic device 1005 in which embodiments of waveform generation based on motion states may be implemented. The electronic device 1005 may correspond to the electronic device 100 of FIG. 1 or electronic device 200 of FIG. 2. The electronic device 1005 may be any type of computing device such as a wearable device, a hearable device, or any on-body electronic device. The electronic device 1005 can be an electronic book reader, a PDA, a mobile phone, a laptop computer, a portable media player, a tablet computer, a camera, a video camera, a netbook, a desktop computer, a gaming terminal, a computing pad, a media center, an audio-input-enabled device, a speech-based personal data assistant, and the like. The electronic device 1005 may be any portable. For example, the electronic device 1005 may be an intelligent voice control and speaker system. Alternatively, the electronic device 1005 can be any other device used in a PAN network, a WLAN network (e.g., Wi-Fi® network), a WAN network, or the like.

The electronic device 1005 includes one or more processor(s) 1030, such as one or more CPUs, microcontrollers, field-programmable gate arrays, or other types of processing devices. The electronic device 1005 also includes system memory 1006, which may correspond to any combination of volatile and/or non-volatile storage mechanisms. The system memory 1006 stores information that provides operating system component 1008, various program modules 1010 such as the waveform generation controller 102 described herein, program data 1012, and/or other components. In one embodiment, the system memory 1006 stores instructions of the methods as described herein. The electronic device 1005 performs functions by using the processor(s) 1030 to execute instructions provided by the system memory 1006.

The electronic device 1005 also includes a data storage device 1014 that may be composed of one or more types of removable storage and/or one or more types of non-removable storage. The data storage device 1014 includes a computer-readable storage medium 1016 on which is stored one or more sets of instructions embodying any of the methodologies or functions described herein, such as the waveform generation controller 102 described herein. Instructions for the program modules 1010 may reside, completely or at least partially, within the computer-readable storage medium 1016, system memory 1006 and/or within the processor(s) 1030 during execution thereof by the electronic device 1005, the system memory 1006, and the processor(s) 1030 also constituting computer-readable media. The electronic device 1005 may also include one or more input devices 1018 (keyboard, mouse device, specialized selection keys, etc.) and one or more output devices 1020 (displays, printers, audio output mechanisms, etc.).

The electronic device 1005 further includes a modem 1022 to allow 1005 to communicate via a wireless network (e.g., provided by the wireless communication system) with other computing devices, such as remote computers, an item-providing system, and so forth. The modem 1022 can be connected to one or more radios 1086. The radios may include a WLAN radio, a WAN radio, PAN radio, or the like, as described herein. Antennas 1088 are coupled to the radios 1086, which are coupled to the modem 1022. The antennas 1088 may include a first WLAN antenna and a second WLAN antenna, and PAN antenna as described herein. Additional antennas may be used and may be GPS antennas, NFC antennas, other WAN antennas, WLAN or PAN antennas, or the like. The modem 1022 allows the electronic device 1005 to handle both voice and non-voice communications (such as communications for text messages, multimedia messages, media downloads, web browsing, etc.) with a wireless communication system. The modem 1022 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1022 may generate signals and send these signals to antennas 1088, via RF radio(s) 1086 as described herein. Electronic device 1005 may additionally include a WLAN radio, a GPS receiver, a PAN transceiver, and/or other RF radios. These RF radios may additionally or alternatively be connected to one or more of antennas 1088. Antennas 1088 may be configured to transmit in different frequency bands and/or using different wireless communication protocols. The antennas 1088 may be directional, omnidirectional, or non-directional antennas. In addition to sending data, antennas 1088 may also receive data, which is sent to appropriate RF radios connected to the antennas.

In one embodiment, the electronic device 1005 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna structure that operates at a first frequency band, and the second wireless connection is associated with a second resonant mode of the antenna structure that operates at a second frequency band. In another embodiment, the first wireless connection is associated with a first antenna element, and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 1022 is shown to control transmission and reception via antenna 1088, the electronic device 1005 may alternatively include multiple modems, each of which is configured to transmit/receive data via a different antenna and/or wireless transmission protocol.

The electronic device 1005 delivers and/or receives items, upgrades, and/or other information via the network. For example, the electronic device 1005 may download or receive items from an item-providing system. The item-providing system receives various requests, instructions, and other data from the electronic device 1005 via the network. The item-providing system may include one or more machines (e.g., one or more server computer systems, routers, gateways, etc.) that have processing and storage capabilities to provide the above functionality. Communication between the item-providing system and the electronic device 1005 may be enabled via any communication infrastructure. One example of such an infrastructure includes a combination of a wide area network (WAN) and wireless infrastructure, which allows a user to use the electronic device 1005 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by products using the Wi-Fi® technology based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the electronic device 1005.

The communication infrastructure may also include a communication-enabling system that serves as an intermediary in passing information between the item-providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The electronic devices 1005 are variously configured with different functionality to enable the consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The electronic devices 1005 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An electronic device comprising:
   millimeter wave (mmWave) frequency front-end circuitry configured to operate in a mmWave frequency range; and
   a baseband processor comprising:
      an Orthogonal Frequency Division Multiplexing (OFDM) physical layer, wherein the OFDM physical layer uses one of a plurality of subcarrier structures to communicate data to a second device in the mmWave frequency range, wherein the electronic device is worn by a user; and a controller coupled to the OFDM physical layer, wherein the controller:

determines a received signal strength indicator (RSSI) value associated with a wireless channel between the electronic device and the second device, wherein the RSSI value is indicative of a physical distance between the second device and the electronic device;

determines phase value associated with the wireless channel;

determines a first state of motion of the electronic device based on the RSSI value being within a first range of values and the phase value being within a second range of values and sends the data to the second device using a first subcarrier structure of the plurality of subcarrier structures; or determines a second state of motion of the electronic device based on the RSSI value being within a third range of values greater than the first range of values and the phase value being either less than or greater than the second range of values and sends the data to the second device using a second subcarrier structure of the plurality of subcarrier structures; or determines that the electronic device is in a third state of motion and sends the data to the second device by alternating between the first subcarrier structure and the second subcarrier structure at a fixed interval.

2. The electronic device of claim 1, wherein:
the first subcarrier structure comprises:
a direct current (DC) subcarrier;
a first set of four data subcarriers;
a first set of four pilot subcarriers with one of the four data subcarriers between each of the four pilot subcarriers and the DC subcarrier; and
a first quadrature amplitude modulation (QAM) scheme; and
the second subcarrier structure comprises:
the DC subcarrier;
a second set of eight data subcarriers;
a second set of four pilot subcarriers with two of the eight data subcarriers between each of the four pilot subcarriers and the DC subcarrier; and
a second QAM scheme;
an amount of motion in the second state of motion is greater than an amount of motion in the first state; and
an amount of motion in the third state of motion is greater than the amount of motion in the second state.

3. The electronic device of claim 1, further comprising:
four or more antenna elements, wherein each antenna element is located at a vertex of a polygon shape, wherein the four or more antenna elements collectively generate a circularly polarized (CP) radiation pattern.

4. A method of operating a first wireless device, the method comprising:
determining a received signal strength indicator (RSSI) value associated with a wireless channel between the first wireless device and a second wireless device, wherein the wireless channel is in a millimeter wave (mmWave) frequency range;

determining a phase value associated with the wireless channel;

determining a state of motion of the first wireless device using the RSSI value and the phase value; and sending data to the second wireless device using a first subcarrier structure of an Orthogonal Frequency Division Multiplexing (OFDM) physical layer, in response to the state of motion being a first state of motion; or sending the data to the second wireless device using a second subcarrier structure of the OFDM physical layer, in response to the state of motion being a second state of motion, wherein movement of the first wireless device is greater in the second state of motion than the first state of motion.

5. The method of claim 4, further comprising:
receiving an RF signal from the second wireless device;
generating samples of the RF signal; and
computing a Fast Fourier Transform (FFT) of the samples;
determining phase information using the FFT of the samples; and
determining the RSSI value using the FFT of the samples.

6. The method of claim 4, further comprising:
determining that the RSSI value is within a first range and the phase value is within a second range, wherein the state of motion is in the first state of motion in response to the RSSI value being within the first range and the phase value being within the second range; or
determining that the RSSI value is within a third range greater than the first range and the phase value is either less than or greater than the second range, wherein the state of motion is in the second state of motion in response to the RSSI value being within the third range and the phase value being either less than or greater than the second range.

7. The method of claim 4, further comprising:
determining a third state of motion, wherein movement of the first wireless device is greater in the third state of motion than the second state of motion; and
sending the data to the second wireless device by alternating between the first subcarrier structure and the second subcarrier structure at a fixed interval.

8. The method of claim 7, wherein the fixed interval is equal to a symbol duration.

9. The method of claim 4, wherein:
the first subcarrier structure comprises:
a direct current (DC) subcarrier;
a first set of two or more data subcarriers;
a first set of two or more pilot subcarriers with one of the two or more data subcarriers between each of the two or more pilot subcarriers and the DC subcarrier; and
a first quadrature amplitude modulation (QAM) scheme; and
the second subcarrier structure comprises:
the DC subcarrier;
a second set of three or more data subcarriers;
a second set of two or more pilot subcarriers with two of the three or more data subcarriers between each of the two or more pilot subcarriers and the DC subcarrier; and
a second QAM scheme.

10. The method of claim 4, wherein:
the first subcarrier structure further comprises a first set of guard band subcarriers with some at frequencies less than a direct current (DC) subcarrier and some at frequencies greater than the DC subcarrier; and the second subcarrier structure further comprises a second set of guard band subcarriers with some at frequencies less than the DC subcarrier and some at frequencies greater than the DC subcarrier.

11. The method of claim 4, wherein the first subcarrier structure comprises:
a direct current (DC) subcarrier;
a first data subcarrier at a first frequency higher than the DC subcarrier;
a first pilot subcarrier at a second frequency higher than the first frequency;
a second data subcarrier at a third frequency lower than the DC subcarrier frequency; and
a second pilot subcarrier at a fourth frequency lower than the third frequency.

12. The method of claim 11, wherein the first subcarrier structure further comprises:
three or more guard band subcarriers at frequencies higher than the fourth frequency; and
two or more guard band subcarriers at frequencies less than the fourth frequency.

13. The method of claim 4, wherein the second subcarrier structure comprises:
a direct current (DC) subcarrier;
a first pair of data subcarriers at a first pair of frequencies higher than the DC subcarrier;
a first pilot subcarrier at a first frequency higher than the first pair of frequencies;
a second pair of data subcarriers at a second pair of frequencies lower than the DC subcarrier; and
a second pilot subcarrier at a second frequency lower than the second pair of frequencies.

14. The method of claim 13, wherein the second subcarrier structure further comprises:
two guard band subcarriers at frequencies higher than the second frequency; and
one guard band subcarrier at frequencies less than the second frequency.

15. The method of claim 4, wherein:
the first subcarrier structure uses a first quadrature amplitude modulation (QAM) scheme with a first number of modulation states; and
the second subcarrier structure uses a second QAM scheme with a second number of modulation states, the second number being greater than the first number.

16. The method of claim 4, wherein:
the second subcarrier structure uses channel coding at a specified rate; and
the first subcarrier structure does not use channel coding.

17. A first wireless device comprising:
millimeter wave (mmWave) frequency front-end (FFE) circuitry; and
a processor coupled to the mmWave FFE circuitry, wherein the processor is to:
determine received signal strength indicator (RSSI) value associated with a wireless channel between the first wireless device and a second wireless device, wherein the wireless channel is in a millimeter wave (mmWave) frequency range;
determine phase value associated with the wireless channel;
determine a state of motion of the first wireless device using the RSSI value and the phase value;
send data to the second wireless device using a first subcarrier structure of an Orthogonal Frequency Division Multiplexing (OFDM) physical layer, in response to the state of motion being a first state of motion; or
send the data to the second wireless device using a second subcarrier structure of the OFDM physical layer, in response to the state of motion being a second state of motion, wherein movement of the first wireless device is greater in the second state of motion than the first state of motion.

18. The first wireless device of claim 17, further comprising:
a set of four or more antenna elements, each located at a vertex of a polygon shape, wherein the set of four or more antenna elements generates a circularly polarized (CP) radiation pattern.

19. The first wireless device of claim 17, wherein:
the first subcarrier structure comprises:
a direct current (DC) subcarrier;
a first set of two or more data subcarriers;
a first set of two or more pilot subcarriers with one of the two or more data subcarriers between each of the two or more pilot subcarriers and the DC subcarrier; and
a first quadrature amplitude modulation (QAM) scheme; and
the second subcarrier structure comprises:
the DC subcarrier;
a second set of three or more data subcarriers;
a second set of two or more pilot subcarriers with two of the three or more data subcarriers between each of the two or more pilot subcarriers and the DC subcarrier; and
a second QAM scheme.

20. The first wireless device of claim 17, wherein the processor is further to:
determine a third state of motion, wherein movement of the first wireless device is greater in the third state of motion than the second state of motion; and
send the data to the second wireless device by alternating between the first subcarrier structure and the second subcarrier structure at a fixed interval.

* * * * *